United States Patent
Morris

(10) Patent No.: US 8,346,853 B2
(45) Date of Patent: Jan. 1, 2013

(54) METHODS, SYSTEMS, AND COMPUTER PROGRAM PRODUCTS FOR PROCESSING AN ATTACHED COMMAND RESPONSE

(76) Inventor: Robert Paul Morris, Raleigh, NC (US)

(*) Notice: Subject to any disclaimer, the term of this patent is extended or adjusted under 35 U.S.C. 154(b) by 154 days.

(21) Appl. No.: 12/788,364

(22) Filed: May 27, 2010

(65) Prior Publication Data

US 2011/0295930 A1 Dec. 1, 2011

(51) Int. Cl.
*G06F 15/16* (2006.01)
(52) U.S. Cl. .......................... 709/203; 709/230
(58) Field of Classification Search .................. None
See application file for complete search history.

(56) References Cited

U.S. PATENT DOCUMENTS

| | | |
|---|---|---|
| 7,587,450 B2 | 9/2009 | Morris |
| 2004/0148328 A1* | 7/2004 | Matsushima ............ 709/200 |
| 2007/0005725 A1 | 1/2007 | Morris |
| 2007/0150814 A1 | 6/2007 | Morris |
| 2008/0077653 A1 | 3/2008 | Morris |
| 2008/0155016 A1* | 6/2008 | Tsai ....................... 709/203 |
| 2009/0144753 A1 | 6/2009 | Morris |
| 2009/0254627 A1 | 10/2009 | Morris |

OTHER PUBLICATIONS

Nielson, H. Frystyk, et al, "HTTP-NG Overview", Internet Draft, Nov. 17, 2009, IETF.
Fielding, R, et al, "Hypertext Transfer Protocol—HTTP/1.1", RFC 2616, Jun. 1999, IETF.
Gettys, Jim, et al, "The WebMUX Protocol", draft-gettys-webmux-00.txt, Aug. 1, 1998, IETF.
Unknown, "The Internet Needs a Session Layer", http://fanf.livejournal.com/53662.html, Mar. 17, 2006.
Berners-Lee, T, "The Original HTTP as defined in 1991", 1991, W3C.
Berners-Lee, T, "Basic HTTP as defined in 1992", 1992, W3C.
Berners-Lee, T, et al.,"Hypertext Transfer Protocol—HTTP/1.0", RFC 1945, May 1996, IETF.
Box, D, et al.,"Simple Object Access Protocol (SOAP) 1.1", W3C Note May 8, 2000, W3C.
Gudgin, M, et al.,"Soap Version 1.2 Part 1: Messaging Framework", 2nd Edition,, W3C Recommendation, Apr. 27, 2007, W3C.
Fielding, R, "Hypertext Transfer Protocol—HTTP/1.1", RFC 2068, Jan. 1997, IETF.

* cited by examiner

*Primary Examiner* — Scott Christensen

(57) ABSTRACT

Methods and systems are described for processing an attached command response. In one aspect, an attachable command is sent in a first HTTP request to a server node. A second HTTP response to a second HTTP request sent to the server node is received. A determination is made that the second HTTP response includes at least a portion of the first command response.

In another aspect, a first command is identified in a first HTTP request received from a user agent node. A determination is made that a first command response to the first command is attachable. A second HTTP request received from the user agent node identifying a second command. A second HTTP response to the second HTTP request is sent including at least some of the first command response.

21 Claims, 13 Drawing Sheets

```
                ┌─904a   ┌─902a
GET www.mySite.us/services/metadata?mediaID=mediaA HTTP/l.l                    900a
Host: finance.myExample.us.com
User-Agent: Mozilla/5.0 (Windows; U; Windows NT 5.1; en-US; rv: 1.8.0.7) Gecko/20060909 Firefox
1.5.0.7
Accept: text/xml,application/xml,application/xhtml+xml,text/html;q=0.9,text/plain;q=0.8, \
image/png,image/jpeg,multipart/attached
Accept-Language: en-us,en;q=0.5          ╲
Accept-Encoding: gzip,deflate             ╲── 908a
Accept-Charset: ISO-8859-l,utf-8;q=0.7,*;q=0.7
Keep-Alive: 300
Connection: keep-alive         ┌─ 906a
Cookie: sessionid=AF13BOC
```

Fig. 9a

```
                ┌─904b   ┌─902b
GET www.mySite.us/media/mediaA HTTP/l.l                                        900b
Host: finance.myExample.us.com
User-Agent: Mozilla/5.0 (Windows; U; Windows NT 5.1; en-US; rv: 1.8.0.7) Gecko/20060909 Firefox
1.5.0.7
Accept: video/*,text/xml,application/xml,application/xhtml+xml,text/html;q=0.9,text/plain;q=0.8, \
image/png,image/jpeg,multipart/attached
Accept-Language: en-us,en;q=0.5          ╲
Accept-Encoding: gzip,deflate             ╲── 908b
Accept-Charset: ISO-8859-l,utf-8;q=0.7,*;q=0.7
Keep-Alive: 300               ┌─ 906b
Connection: keep-alive
Cookie: sessionid=AF13BOC
```

Fig. 9b

```
                    ┌─ 912c
HTTP/I.I 200 OK
Date: Wed, 08 Sep 200417:32:31 GMT                                              900c
Server: Apache/1.3.27 (Unix) (Red-Hat!Linux) PHP/4.1.2
Last-Modified: Wed, 08 Sep 2004 17:02:40 GMT
Content-Length: ???
MIME-Version: 1.0
Content-Type: multipart/attached; boundary="unique----------------"

Returned in order
 --unique---------------
Content-Type: text/plain      ┌─ 904c                                        ┐
                                                                             │
Title="My Short Clip", Director="J D Director", Producer="P J Producer", ....│  906c
                                                                             ┘

--unique---------------
Content-Type: video/wav Content-Transfer-Encoding: base64   ┌─ 908c          ┐
                                                                             │
PGh0bWw+CiAgPGhlYWQ+CiAgPC9oZWFkPgoglDxib2R5PgoglCAgPHA+VGhpcy              │  910c
Ym9keSBvZiB0aGUgbWVzc2FnZS48L3A+CiAgPC9ib2R5Pgo8L2h0bWw+Cg==                │
-- --unique---------------                                                   ┘
```

Fig. 9c

1004a —— POST www.mySite.us/path/formHandler.cgi HTTP/1.1
Host: finance.myExample.us.com ——— 1002a
User-Agent: Mozilla/5.0 (Windows; U; Windows NT 5.1, en-US; rv: 1.8.0.7) Gecko/
20060909 Firefox 1.5.0.7
Accept: text/xml,application/xml,application/xhtml+xml,text/html;q=0.9,text/
plain;q=0.8, \
image/png,image/jpeg
Accept-Language: en-us,en;q=0.5
Accept-Encoding: gzip,deflate                                            1000a
Accept-Charset: ISO-8859-1,utf-8;q=0.7,*;q=0.7
Keep-Alive: 300
Connection: keep-alive
Cookie: sessionid=AF13BOC, [attach=07bf3c7de]
Attach- yes; correlator=07bf3c7de
Content-Type: application/x-www-form-urlencoded
Content-Length: 32
                       —— 1006a
home=Cosby&favorite+flavor=flies

Fig. 10a

/—— 1004b
HTTP/1.1 299 Attached
Date: Wed, 08 Sep 2004 17:32:31 GMT
Server: Apache/1.3.27 (Unix) (Red-Hat!Linux) PHP/4.1.2
Last-Modified: Wed, 08 Sep 2004 17:02:40 GMT                    1000b
Cookie: sessionid=AF13BOC, attach=07bf3c7de ——————— 1008b
Attach: Yes;correlator-07bf3c7de ——————— 1006b

Fig. 10b

```
                    ┌─ 1012c
HTTP/1.1 200 OK
Date: Wed, 08 Sep 200417:32:31 GMT
Server: Apache/1.3.27 (Unix) (Red-Hat!Linux) PHP/4.1.2
Last-Modified: Wed, 08 Sep 2004 17:02:40 GMT                      1000c
Cookie: sessionid=AF13BOC
Content-Length: ???
MIME-Version: 1.0 Content-Type: multipart/mixed; boundary=unique-boundary-1

--unique-boundary-1              ⎤
            ┌─ 1008c             ⎥
... Second command response t... ⎦  1010c --unique-boundary-1                                ⎤
Content-type: text/plain; charset=US-ASCII         ⎥
Attach: complete; correlator-07bf3c7de             ⎥
Status-Code=200                                    ⎥  1006c
Cookie: [attach=07bf3c7de]                         ⎥
                      ┌─ 1004c                     ⎥
....Attached command response identified by correlator ⎦

--unique-boundary-1
```

Fig.10c

METHODS, SYSTEMS, AND COMPUTER PROGRAM PRODUCTS FOR PROCESSING AN ATTACHED COMMAND RESPONSE

RELATED APPLICATIONS

This application is related to the following commonly owned U.S. patent applications, the entire disclosure of each being incorporated by reference herein: application Ser. No. 12/788,373, filed on 2010 May 27, entitled "Methods, Systems, and Program Products for Preventing Processing of an HTTP Response"; and Application Ser. No. 12/788,381, filed on 2010 May 27, entitled "Methods, Systems, and Program Products for Processing a Combined Command Response".

BACKGROUND

The Web is designed for requesting readily available resources. The protocol of the Web, Hypertext Transfer Protocol (HTTP), is a request/response protocol. When a command identified in an HTTP request cannot be performed immediately a server can make a requesting user agent wait by holding a connection with the requester open until the command can be performed. Alternatively, the server may send an HTTP response including a status code indicating the command cannot be performed. Alternatively, some applications return a web page in the HTTP response that informs the user that s/he will be receiving a response out-of-band via, for example, email. Other applications return a web page or other presentable representation that tells the user to check back later by sending another command via another HTTP request to check on the status of a long-running command or an otherwise uncompleted command. Another option currently used is to configure a server to return, to a browser, a script that repeatedly sends additional HTTP requests identifying a command until the command is complete. This occupies a window or tab of a web browser and requires the user to wait. If the user closes the waiting window or tab, the request is cancelled.

Out-of-band responses such as an email are typically used for relatively long wait times and polling via a script or by the user is typically used for relatively shorter wait times. Techniques such as notification by email have the advantage of freeing browser resources during the wait and allow the user to continue browsing without having to maintain an open window or tab for the uncompleted command or operation. Polling techniques allow the user to receive a command response to a completed command in the same application environment in which the command is requested, typically a web browser. Ideally, the advantages of these approaches would be combined and the disadvantages avoided. Current solutions do not achieve these goals.

Accordingly, there exists a need for methods, systems, and computer program products for processing an attached command response.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and systems are described for processing an attached command response. In one aspect, the method includes sending, in a first HTTP request to a server node, first command information identifying a first command. The method further includes sending, in a second HTTP request, second command information identifying a second command. The method still further includes receiving a second HTTP response to the second HTTP request. The method additionally includes determining, in response to sending the first command information, that the second HTTP response includes an attached command response including at least a portion of a first command response to the first command.

Further, a system for processing an attached command response is described. The system includes an execution environment including an instruction-processing unit configured to process an instruction included in at least one of a request-out component, a response-in component, and an attached response component. The system includes the request-out component configured for sending, in a first HTTP request to a server node, first command information identifying a first command. The system further includes the request-out component configured for sending, in a second HTTP request, second command information identifying a second command. The system still further includes the response-in component configured for receiving a second HTTP response to the second HTTP request. The system also includes the attached response component configured for determining, in response to sending the first command information, that the second HTTP response includes an attached command response including at least a portion of a first command response to the first command.

In another aspect, a method for processing an attached command response is described that includes receiving, in a first HTTP request from a user agent node, first command information identifying a first command. The method further includes determining that a first command response to the first command is attachable. The method still further includes receiving, in a second HTTP request from the user agent node, second command information identifying a second command. The method also includes sending, in a second HTTP response to the second HTTP request, an attached command response including at least a portion of a first command response to the first command, in response to determining that the first command response is attachable.

Still further, a system for processing an attached command response is described. The system includes an execution environment including an instruction-processing unit configured to process an instruction included in at least one of a request-in component, an attach detector component, and an attach director component. The system includes the request-in component configured for receiving, in a first HTTP request from a user agent node, first command information identifying a first command. The system further includes the attach detector component configured for determining that a first command response to the first command is attachable. The system still further includes the component configured for receiving, in a second HTTP request from the user agent node, second command information identifying a second command. The system also includes the attach director component configured for sending, in a second HTTP response to the second HTTP request, an attached command response including at least a portion of a first command response to the first command, in response to determining that the first command response is attachable.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which:

FIG. 9a Illustrates an exemplary request message according to an aspect of the subject matter described herein;

FIG. 9b Illustrates an exemplary request message according to an aspect of the subject matter described herein;

FIG. 9c Illustrates an exemplary response message according to an aspect of the subject matter described herein;

FIG. 10a Illustrates an exemplary request message according to an aspect of the subject matter described herein;

FIG. 10b Illustrates an exemplary response message according to an aspect of the subject matter described herein; and FIG. 10c Illustrates an exemplary response message according to an aspect of the subject matter described herein.

DETAILED DESCRIPTION

Figure 1:
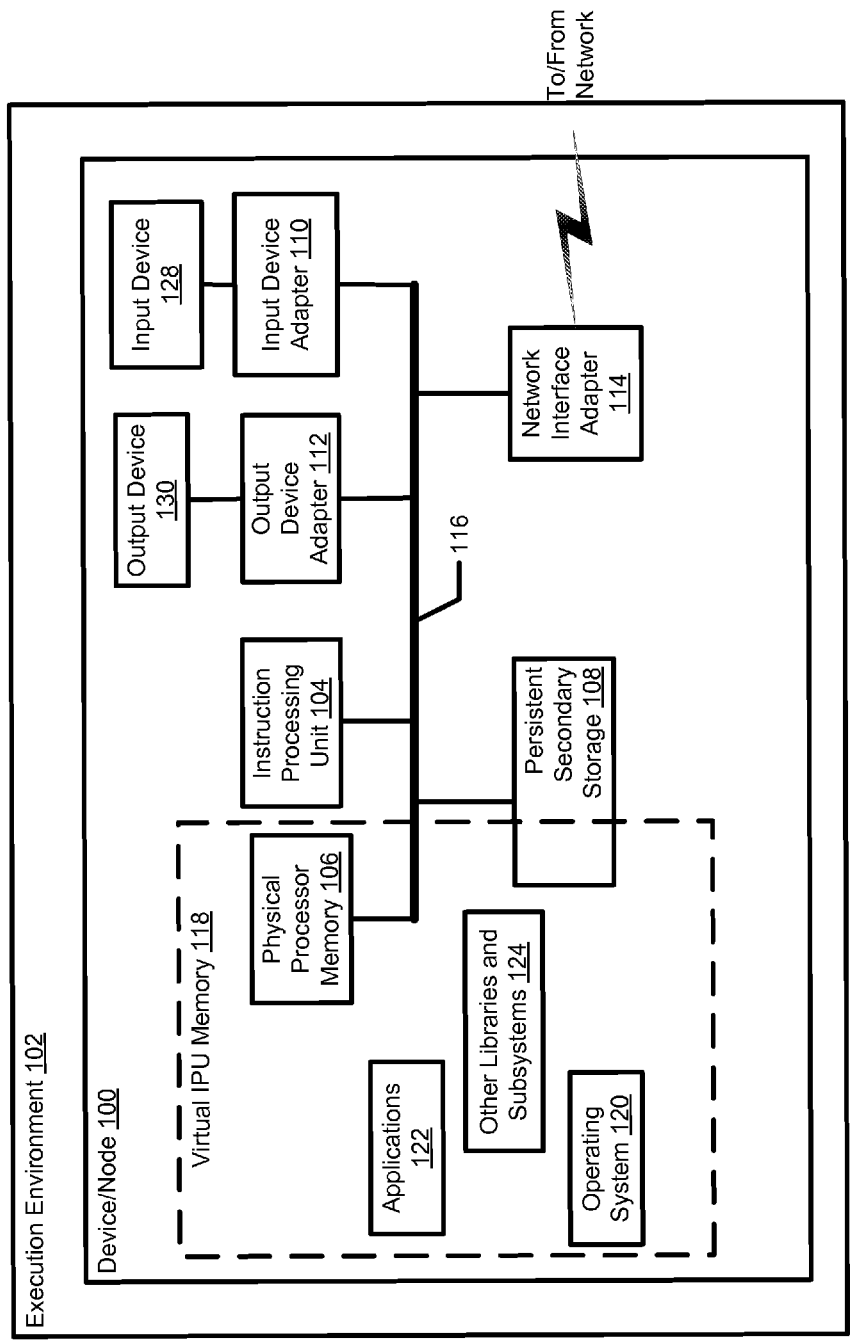
FIG. 1 is a block diagram illustrating an exemplary hardware device included in and/or otherwise providing an execution environment in which the subject matter may be implemented.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art that one or more aspects of the disclosure may be practiced with a lesser degree of these specific details. In other instances, well-known structures and devices are shown in block diagram form in order to facilitate describing one or more aspects of the disclosure.

An exemplary device included in an execution environment that may be configured according to the subject matter is illustrated in FIG. 1. An execution environment includes an arrangement of hardware and, optionally, software that may be further configured to include an arrangement of components for performing a method of the subject matter described herein. An execution environment includes and/or is otherwise provided by one or more devices. An execution environment may include a virtual execution environment including software components operating in a host execution environment. Exemplary devices included in or otherwise providing suitable execution environments for configuring according to the subject matter include personal computers, notebook computers, tablet computers, servers, hand-held and other mobile devices, multiprocessor devices, distributed devices, consumer electronic devices, and/or other network-enabled devices. Those skilled in the art will understand that the components illustrated in FIG. 1 are exemplary and may vary by particular execution environment.

FIG. 1 illustrates hardware device 100 included in execution environment 102. FIG. 1 illustrates that execution environment 102 includes instruction-processing unit (IPU) 104, such as one or more microprocessors; physical processor memory 106 including storage locations identified by addresses in a physical memory address space of IPU 104; persistent secondary storage 108, such as one or more hard drives and/or flash storage media; input device adapter 110, such as a key or keypad hardware, a keyboard adapter, and/or a mouse adapter; output device adapter 112, such as a display or audio adapter for presenting information to a user; a network interface component, illustrated by network interface adapter 114, for communicating via a network such as a LAN and/or WAN; and a communication mechanism that couples elements 104-114, illustrated as bus 116. Elements 104-114 may be operatively coupled by various means. Bus 116 may comprise any type of bus architecture, including a memory bus, a peripheral bus, a local bus, and/or a switching fabric.

IPU 104 is an instruction execution machine, apparatus, or device. Exemplary IPUs include one or more microprocessors, digital signal processors (DSPs), graphics processing units, application-specific integrated circuits (ASICs), and/or field programmable gate arrays (FPGAs). In the description of the subject matter herein, the terms "IPU" and "processor" are used interchangeably. IPU 104 may access machine code instructions and data via one or more memory address spaces in addition to the physical memory address space. A memory address space includes addresses identifying locations in a processor memory. The addresses in a memory address space are included in defining a processor memory. IPU 104 may have more than one processor memory. Thus, IPU 104 may have more than one memory address space. IPU 104 may access a location in a processor memory by processing an address identifying the location. The processed address may be in an operand of a machine code instruction and/or may be identified in a register or other portion of IPU 104.

FIG. 1 illustrates virtual processor memory 118 spanning at least part of physical processor memory 106 and at least part of persistent secondary storage 108. Virtual memory addresses in a memory address space may be mapped to physical memory addresses identifying locations in physical processor memory 106. An address space for identifying locations in a virtual processor memory is referred to as a virtual memory address space; its addresses are referred to as virtual memory addresses; and its processor memory is known as a virtual processor memory or virtual memory. The term "processor memory" may refer to physical processor memory 106 and/or virtual processor memory 118 depending on the context in which the term is used.

Physical processor memory 106 may include various types of memory technologies. Exemplary memory technologies include static random access memory (SRAM) and/or dynamic RAM (DRAM) including variants such as dual data rate synchronous DRAM (DDR SDRAM), error correcting code synchronous DRAM (ECC SDRAM), and/or RAM-BUS DRAM (RDRAM). Physical processor memory 106 may include volatile memory as illustrated in the previous sentence and/or may include nonvolatile memory such as nonvolatile flash RAM (NVRAM) and/or ROM.

Persistent secondary storage 108 may include one or more flash memory storage devices, one or more hard disk drives, one or more magnetic disk drives, and/or one or more optical disk drives. Persistent secondary storage may include removable media. The drives and their associated computer readable storage media provide volatile and/or nonvolatile storage for computer readable instructions, data structures, program components, and other data for execution environment 102.

Execution environment 102 may include software components stored in persistent secondary storage 108, in remote storage accessible via a network, and/or in a processor memory. FIG. 1 illustrates execution environment 102 including operating system 120, one or more applications 122, and other program code and/or data components illustrated by other libraries and subsystems 124. In an aspect, some or all software components may be stored in locations accessed by IPU 104 in a shared memory address space shared by the software components. The software components accessed via the shared memory address space are stored in a shared processor memory defined by the shared memory address space. In another aspect, a first software component may be stored in one or more locations accessed by IPU 104 in a first address space and a second software component may be stored in one or more locations accessed by IPU 104 in a second address space. The first software component is stored in a first processor memory defined by the first address space and the second software component is stored in a second processor memory defined by the second address space.

Software components typically include instructions executed by IPU 104 in a context referred to as a "process". A process may include one or more "threads". A thread includes a sequence of instructions executed by IPU 104 in a thread context. The terms "thread" and "process" may be used interchangeably herein when a process includes only one thread.

Execution environment 102 may receive user-provided information via one or more input devices illustrated by input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding communication interfaces such as a serial port, a parallel port, and/or a universal serial bus (USB) port. Input device adapter 110 receives input and provides a representation to bus 116 to be received by IPU 104, physical processor memory 106, and/or other components included in execution environment 102.

Output device 130 in FIG. 1 exemplifies one or more output devices that may be included in and/or may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an input device may also include an output device. Examples include a phone, a joystick, and/or a touch screen. In addition to various types of display devices, exemplary output devices include printers, speakers, tactile output devices such as motion producing devices, and other output devices producing sensory information detectable by a user.

A device included in or otherwise providing an execution environment may operate in a networked environment communicating with one or more devices via one or more network interface components. The terms "communication interface component" and "network interface component" are used interchangeably. FIG. 1 illustrates network interface adapter (NIA) 114 as a network interface component included in execution environment 102 to operatively couple device 100 to a network. A network interface component includes a network interface hardware (NIH) component and optionally a software component. The terms "network node" and "node" in this document both refer to a device having a network interface component for operatively coupling the device to a network. The terms "device" and "node" as used herein refer to one or more devices and nodes, respectively, providing and/or otherwise included in an execution environment unless clearly indicated otherwise.

Exemplary network interface components include network interface controller components, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., a cellular, PCS, CDMA, and/or GSM network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

The Hypertext Transfer Protocol (HTTP) is specified in "Request for Comments" (RFC) document RFC 2616 by R. Fielding, et al., titled "Hypertext Transfer Protocol—HTTP/1.1" (June 1999). Terms from RFC 2616 are defined below as used herein and are used in describing the subject matter in this document.

An "HTTP request" as used herein is defined in section 5 of RFC 2616 along with adaptations and/or extensions described below. An "HTTP response" as used herein is defined in section 6 of RFC 2616 along with adaptations and/or extensions described below. A "resource" is a data object or service that can be identified by a universal resource identifier (URI). An "HTTP entity" is information transferred as the payload of an HTTP request or an HTTP response. The term "HTTP entity" as used herein is defined as the term "entity" is defined in RFC 2616. An HTTP entity includes of meta-information in the form of entity-header fields and content in the form of an entity-body. An "HTTP representation" is an HTTP entity that is subject to content negotiation. The term "HTTP representation" is used herein as the term "representation" is used and defined in RFC 2616.

The terms "user agent" and "server" refer to roles played by one or more components and/or devices operating in an execution environment, and/or systems in an HTTP communication. A "user agent" initiates and/or sends a command in an HTTP request. A "server" accepts a command identified in an HTTP request in order to process the command. The terms "server", "service", and "service provider" are used interchangeably herein. Processing a command includes performing and/or otherwise providing for performing the command. The performing of the command may be successful or unsuccessful. As defined and described herein a server may send information in an HTTP response to a user agent in response to receiving a command from the user agent in an HTTP request.

A command identified in an HTTP request may be processed by a service provider. For example, a service provider may retrieve and/or generate a resource in processing a command. As used herein, a "command response" is a result produced in processing a command, from a user agent, identified in an HTTP request. The command response is produced to return to the user agent. A command response is returned in an HTTP response as specified in RFC 2616 and as further described herein according to the subject matter. According to the subject matter described herein, a command response may be returned in one or more HTTP responses.

Figure 2A:
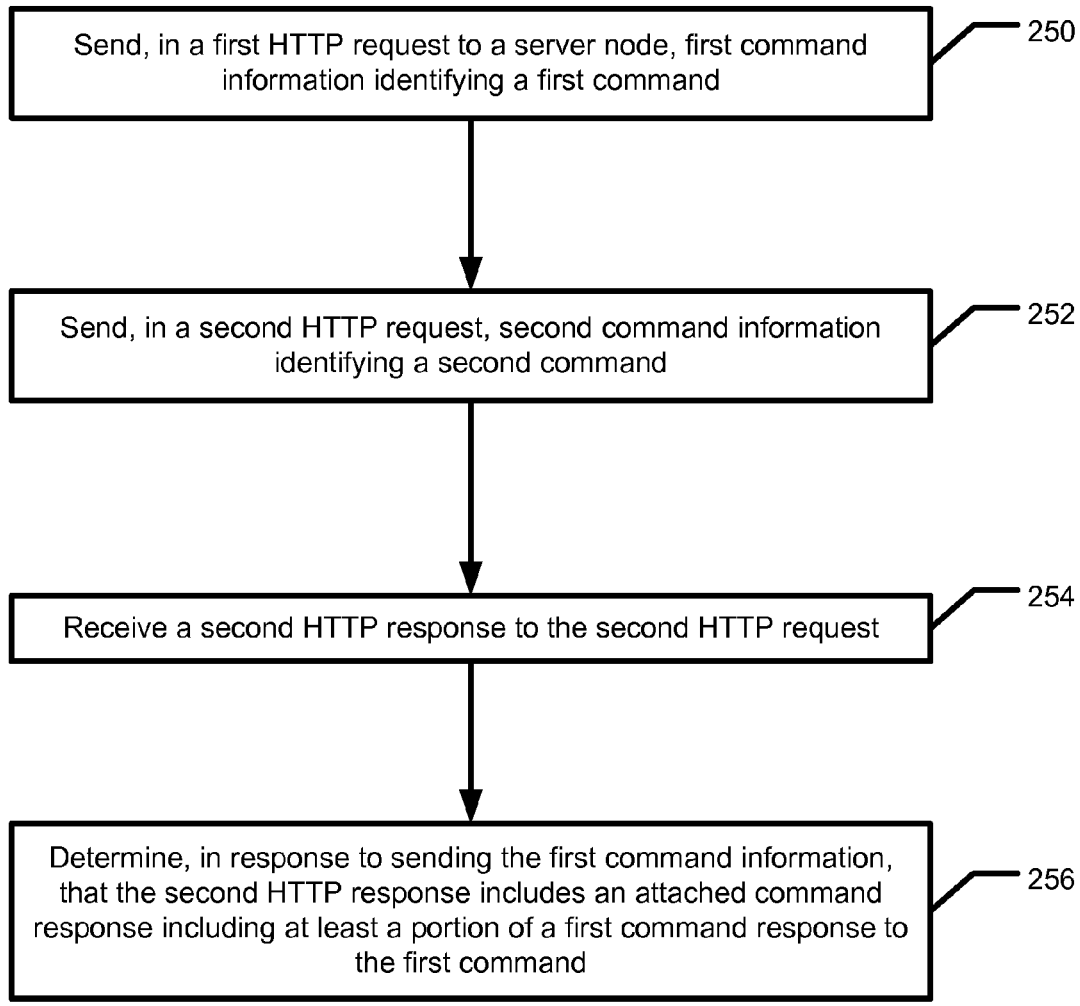
FIG. 2a is a flow diagram illustrating a method for processing an attached command response according to an aspect of the subject matter described herein.
Figure 3A:
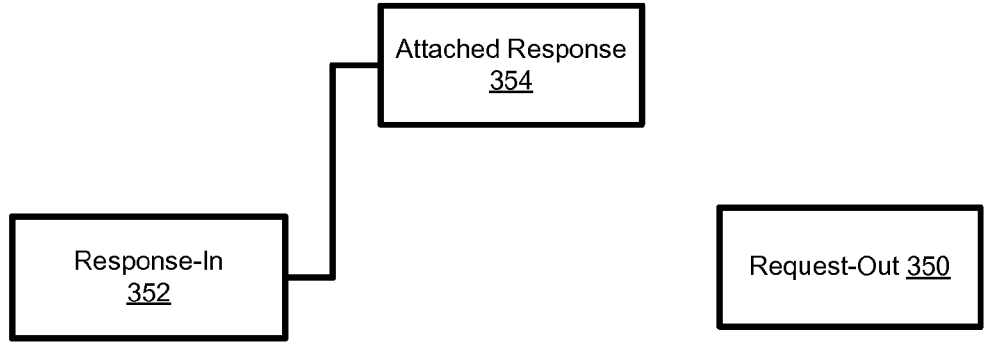
FIG. 3a is a block diagram illustrating an arrangement of components for processing an attached command response according to another aspect of the subject matter described herein.
Figure 4:
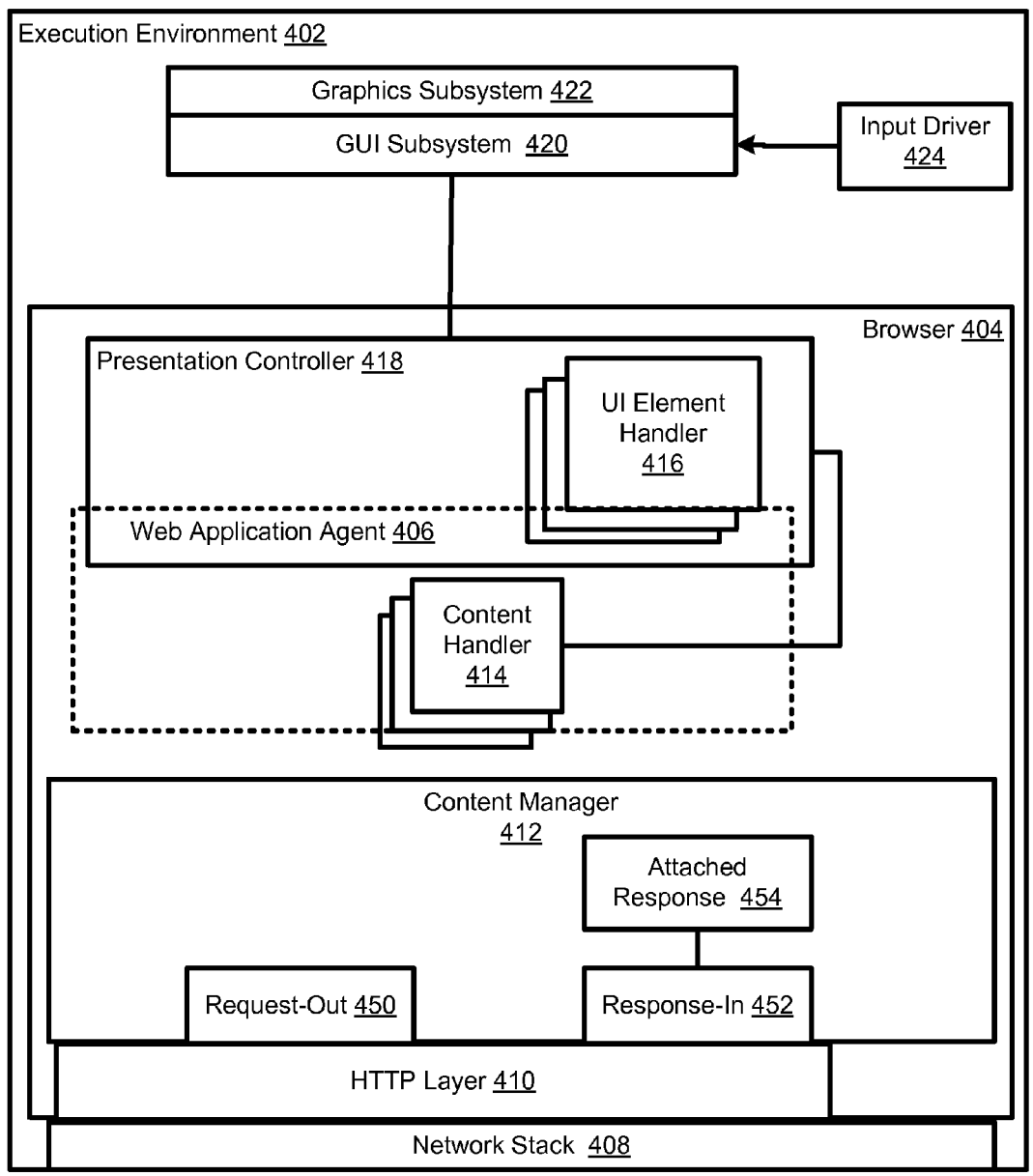
FIG. 4 is a block diagram illustrating an arrangement of components for processing an attached command response according to another aspect of the subject matter described herein.

The block diagram in FIG. 3a illustrates an exemplary system for processing an attached command response according to the method illustrated in FIG. 2a. A system for performing the method illustrated in FIG. 2a includes an execution environment, including an instruction-processing unit, configured to process an instruction included in at least one of a request-out component 350, a response-in component 352, and an attached response component 354 illustrated in FIG. 3a. Some or all of the exemplary components illustrated in FIG. 3a may be adapted for performing the method illustrated in FIG. 2a in a number of execution environments. FIG. 4 is a block diagram illustrating the components of FIG. 3a and/or analogs of the components of FIG. 3a adapted for operation in execution environment 402 including or otherwise provided by one or more nodes.

Figure 2B:
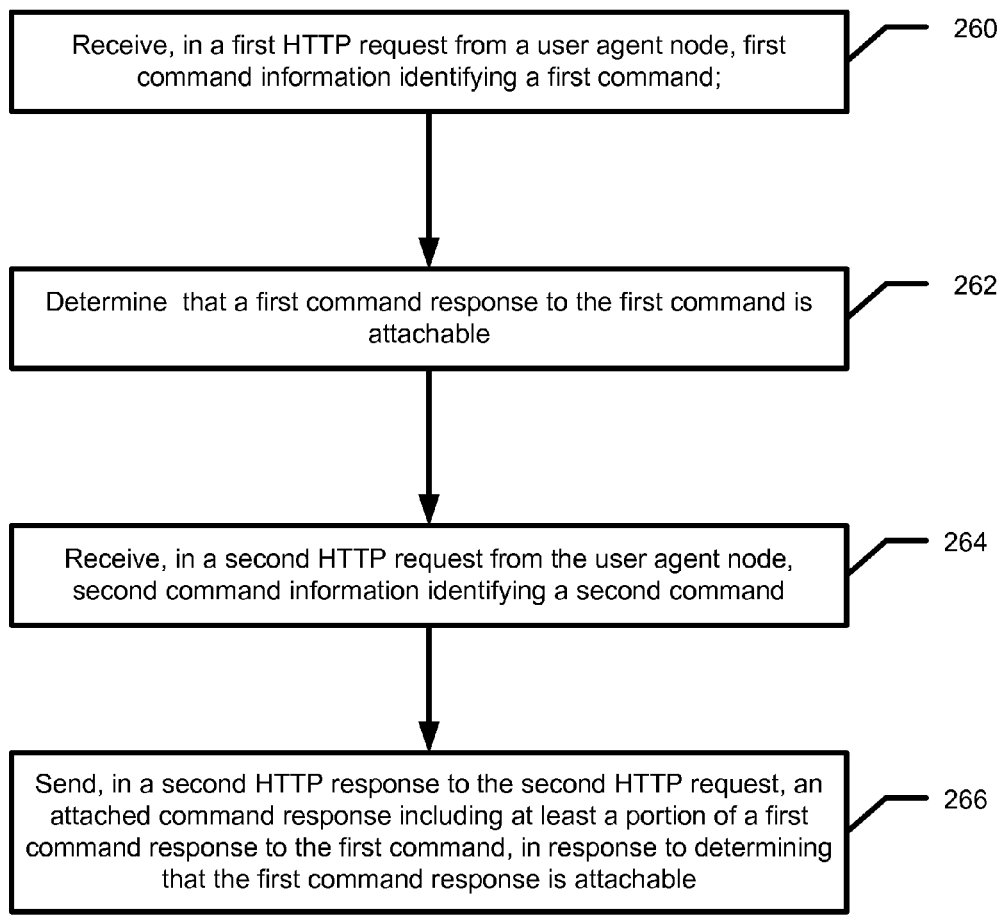
FIG. 2b is a flow diagram illustrating a method for processing an attached command response according to an aspect of the subject matter described herein.
Figure 3B:
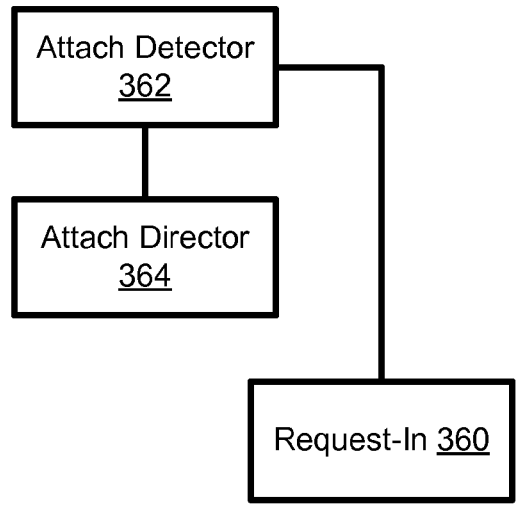
FIG. 3b is a block diagram illustrating an arrangement of components for processing an attached command response according to another aspect of the subject matter described herein.
Figure 5:
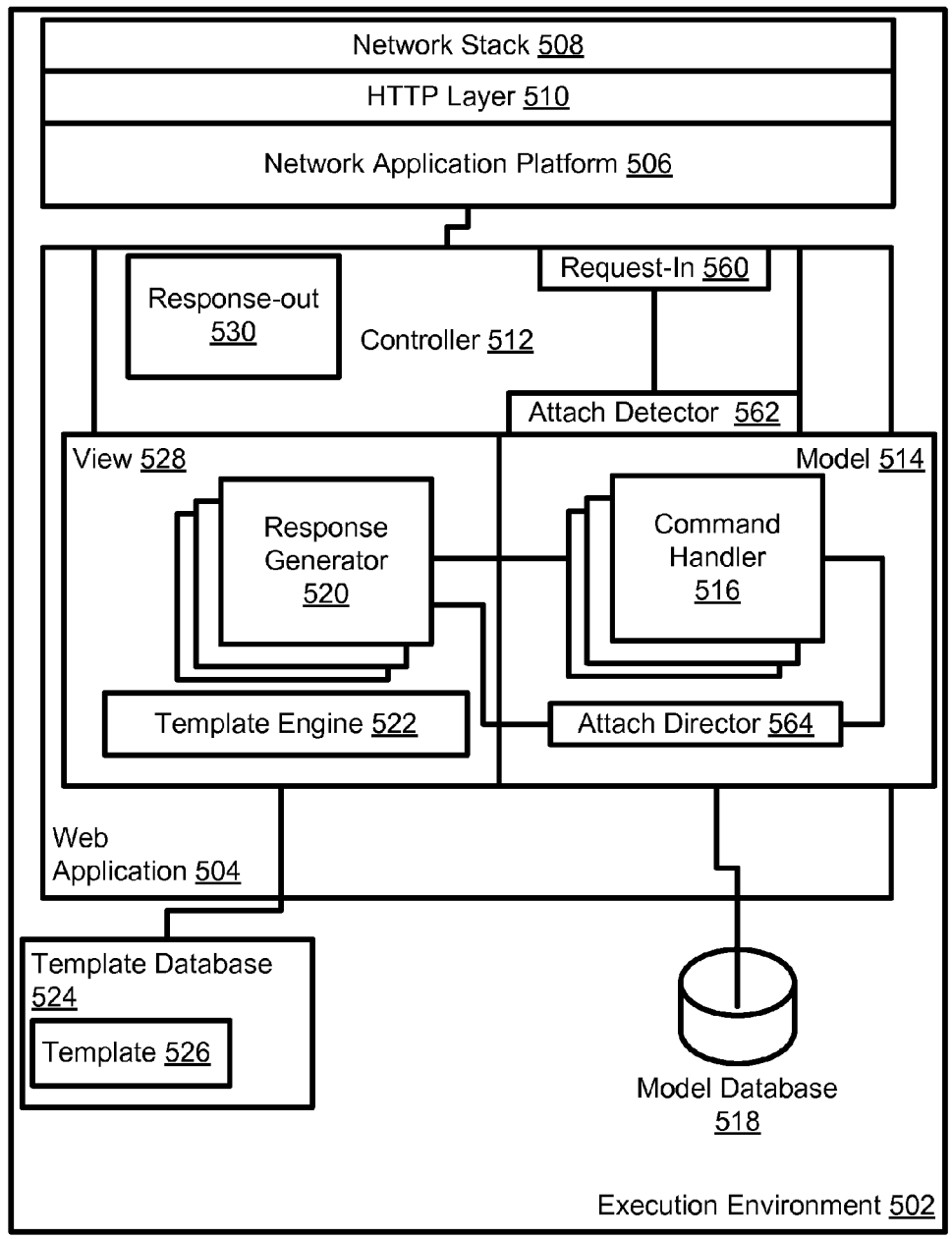
FIG. 5 is a block diagram illustrating an arrangement of components for processing an attached command response according to another aspect of the subject matter described herein.

The block diagram in FIG. 3b illustrates an exemplary system for processing an attached command response according the method illustrated in FIG. 2b. A system for performing the method illustrated in FIG. 2b includes an execution environment, including an instruction-processing unit, configured to process an instruction in at least one of a request-in component 360, an attach detector component 362, and a attach director component 364 illustrated in FIG. 3b. Some or all of the exemplary components illustrated in FIG. 3b may be adapted for performing the method illustrated in FIG. 2b in a number of execution environments. FIG. 5 is a block diagram illustrating the components of FIG. 3b and/or analogs of the components of FIG. 3b adapted for operation in execution environment 502 including or otherwise provided by one or more nodes.

FIG. 1 illustrates components of an exemplary device that may at least partially provide and/or otherwise be included in an execution environment. The components illustrated in FIG. 4 and FIG. 5 may be included in or otherwise combined with the components of FIG. 1 to create a variety of arrangements of components according to the subject matter described herein.

Figure 6:
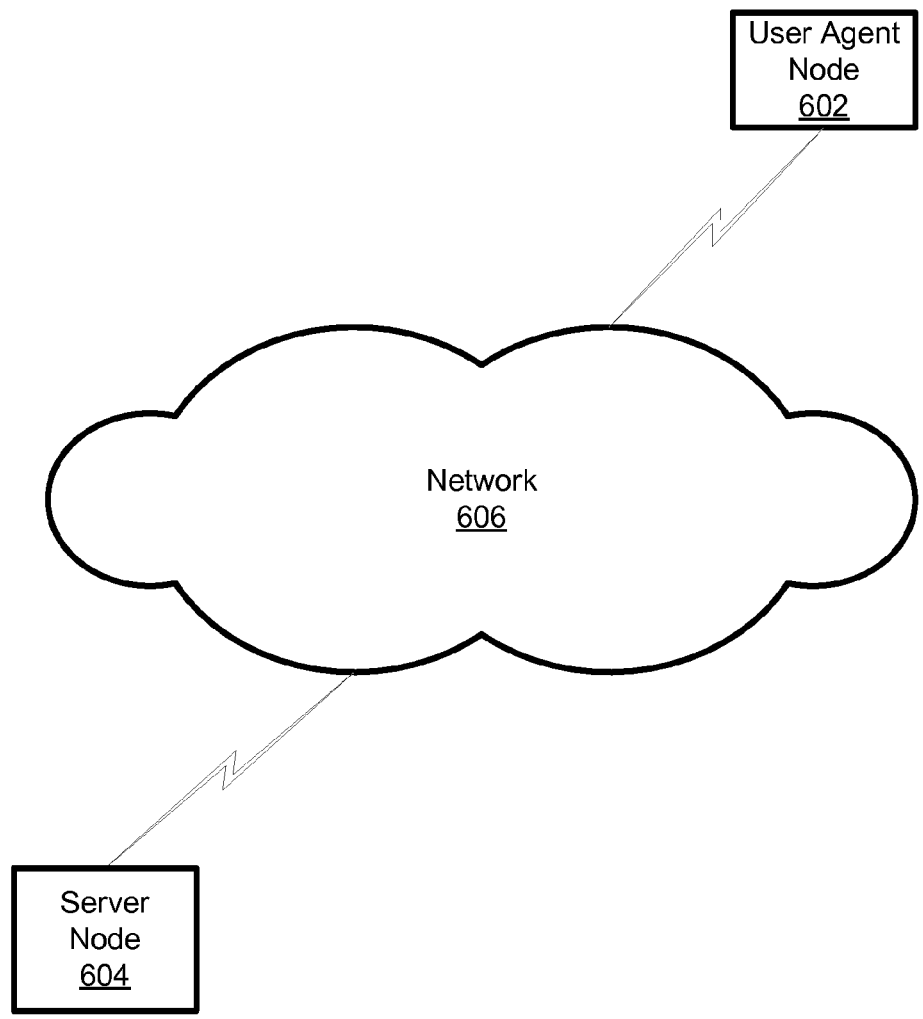
FIG. 6 is a network diagram illustrating an exemplary system for processing an attached command response according to an aspect of the subject matter described herein.

FIG. 6 illustrates user agent node 602 and server node 604 as exemplary devices included in and/or otherwise adapted for providing execution environment 402 and execution environment 502, respectively. As illustrated in FIG. 6, user agent node 602 and server node 604 are operatively coupled to network 606 via respective network interface components enabling user agent node 602 and server node 604 to communicate.

FIG. 4 illustrates execution environment 402 hosting a web browsing application illustrated as browser 404. It is common in HTTP communications for a browser and/or a web application agent operating in a browser to operate as user agents. FIG. 4 illustrates browser 404 including an adaptation of the arrangement of components in FIG. 3a. Web application agent 406 is illustrated operating in browser 404 and may be received from a remote application provider, such as web application 504 in FIG. 5. Browser 404 and execution environment 402 may provide at least part of an execution environment for web application agent 406. Browser 404, web application agent 406, HTTP layer 410, and/or user agent node 602 may operate in the role of user agent and/or may include a component operating as a user agent. FIG. 5 illustrates execution environment 502 hosting web application 504, typically operating in the role of a server in an HTTP communication. FIG. 5 illustrates an adaptation of the arrangement of components in FIG. 3b operating in web application 504.

As stated, the various adaptations of the arrangements in FIG. 3a and in FIG. 3b are not exhaustive. For example, those skilled in the art will see based on the description herein that arrangements of components for performing the methods illustrated in FIG. 2a and FIG. 2b may be distributed across more than one node and/or execution environment. For example, such an arrangement may operate at least partially in browser 404 in FIG. 4 and at least partially in execution environment 502 in FIG. 5.

FIG. 4 illustrates network stack 408 configured for sending and receiving messages over network 606 in FIG. 6, such as the Internet, via a network interface component of user agent node 602. FIG. 5 illustrates a network application platform 506 providing services to one or more web applications. FIG. 5 also illustrates network application platform 506 configured for interoperating with network stack 508. Network stack 408 and network stack 508 may support the same protocol suite, such as TCP/IP, or may communicate via a network gateway or other protocol translation device and/or service. Browser 404 in FIG. 4 and network application platform 506 in FIG. 5 may interoperate via their respective network stacks. Browser 404 and web application 504 may communicate via one or more application layer protocols. FIG. 4 illustrates HTTP layer 410 exemplifying an application layer protocol. FIG. 5 illustrates a compatible HTTP protocol layer as HTTP layer 510.

Browser 404, in FIG. 4, may receive some or all of web application agent 406 in one more messages sent from web application 504, in FIG. 5, via network application platform 506; and network stacks, network interface components, and optionally HTTP layers in the respective execution environments. In FIG. 4, browser 404 includes content manager component 412. Content manager component 412 may interoperate with HTTP layer component 410 and/or network stack 408 to receive the message or messages including some or all of web application agent 406.

Web application agent 406 may include a web page or other data representation for presenting a user interface for web application 504. The web page may include and/or reference data represented in one or more formats including hypertext markup language (HTML) and/or other markup languages, ECMAScript or other scripting languages, byte code, image data, audio data, and/or machine code to name just a few valid data representations depending on the capabilities of a receiving user agent node.

In response to an HTTP request including a command received from browser 404, controller component 512, in FIG. 5, may invoke model subsystem 514 to perform command specific processing. Model subsystem 514 may include any number of command processors, illustrated as command handler components 516, for dynamically generating data and/or retrieving data from model database 518 based on the command. Controller component 512 may further invoke one or more response generator components 520 for generating a command response to the received command. The one or more response generator components 520 may invoke template engine component 522 to identify one or more templates and/or other static data to combine with data received from command handler component(s) 516 generated in processing the command. FIG. 5 illustrates template database 524 including an exemplary template 526. The one or more response generator component(s) 520 in view subsystem 528 may interoperate with response-out component 530 in controller component 512 to return a command response generated from processing a command. The command response may be returned in one or more data formats suitable for a user agent, such as browser 404. Response-out component 530 may receive command response data from one or more response generator components 520 as one or more HTTP entities, and/or one or more HTTP representations. Alternatively or additionally, response-out component 530 may transform data from one or more response generator component(s) 520 into one or more HTTP entities and/or HTTP representations. Response-out component 530 may send the one or more HTTP entities in an HTTP response, in response to the HTTP request received from browser 404. Some or all of web application agent 406 may be sent to browser 404 via network application platform 506 in the manner described.

One or more HTTP responses including one or more representations of some or all of web application agent 406 may be received by content manager component 412 via HTTP layer 410 and network stack 408. In FIG. 4, browser 404 includes one or more content handler components 414 to process received HTTP representations according to their data types, typically identified by MIME-type identifiers. Exemplary content handler components 414 include a text/html content handler component for processing HTML representations; an application/xmpp-xml content handler component for processing XMPP streams including presence tuples, instant messages, and publish-subscribe data as defined by various XMPP specifications; one or more video content handler components for processing video representations of various types; and still image data content handler components for processing various image data representations. Content handler component(s) 414 process received HTTP representations and may provide data from the HTTP representations to one or more user interface element handler components 416.

User interface element handler components 416 are illustrated in presentation controller component 418 in FIG. 4. Presentation controller component 418 may manage visual, audio, and other types of output for its including application as well as receive and route detected user and other inputs to components and extensions of its including application, browser 404. With respect to FIG. 4, a user interface element handler component 416 may be adapted to operate at least partially in a content handler component 414 such as a text/html content handler component and/or a script content handler component. Additionally or alternatively, a user interface element handler component in execution environment 402 may operate in web application agent 406 and/or other extension of its including application, such as a plug-in providing a virtual machine for script and/or byte code.

Figure 7:
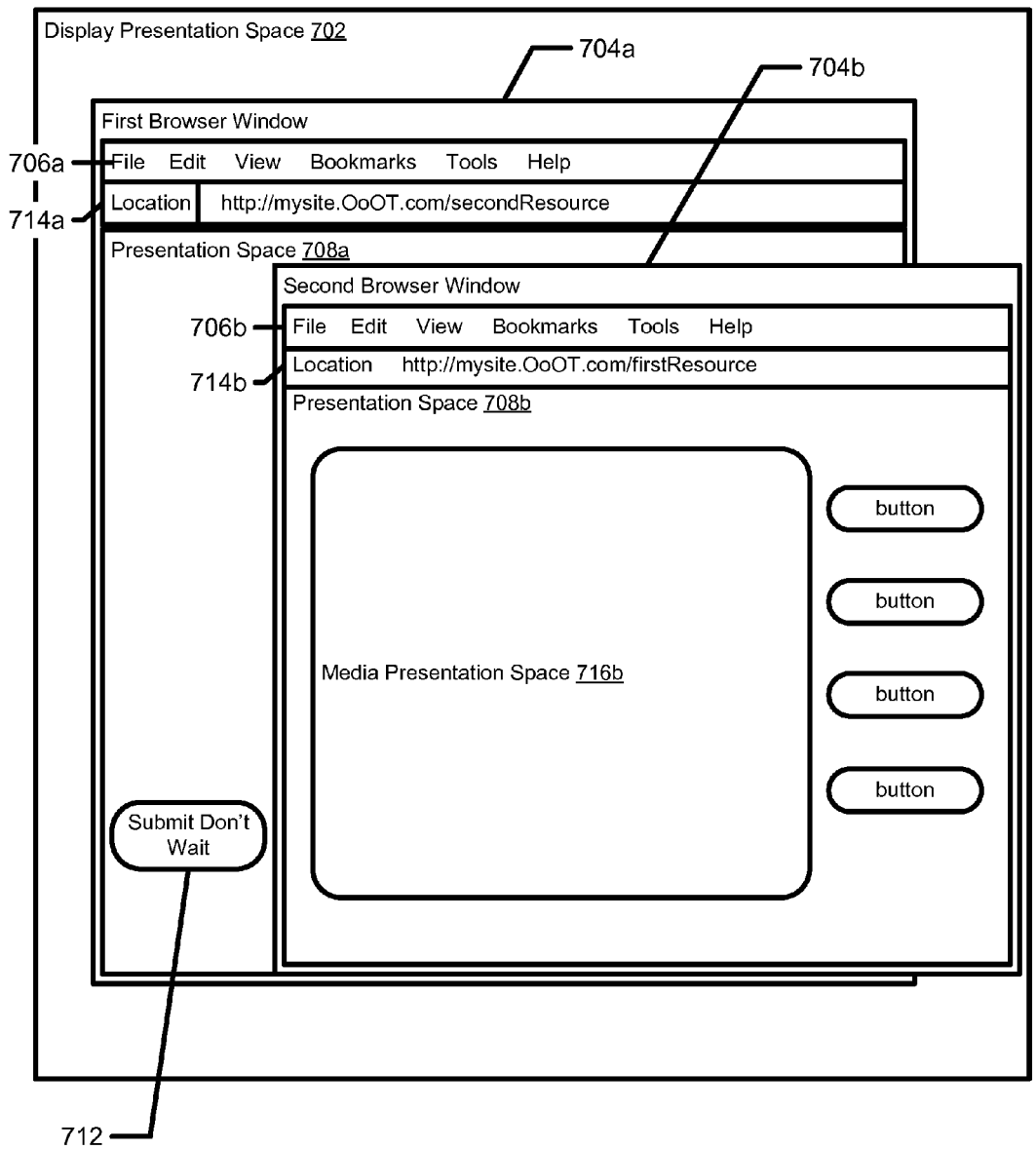
FIG. 7 is a diagram illustrating a user interface presented via a display according to an aspect of the subject matter described herein.

FIG. 7 illustrates a presentation space 702 of a display device, such as output device 130 in FIG. 1. Presentation space 702 includes first browser window 704a of browser 404, web application agent 406, and/or web application 504. FIG. 7 is used to illustrate various exemplary visual components of one or more of browser 404, web application agent 406, and web application 504.

The components of a user interface are generically referred to herein as user interface elements. More specifically, visual components of a user interface are referred to herein as visual interface elements. A visual interface element may be a visual component of a graphical user interface (GUI). Exemplary visual interface elements include windows, textboxes, sliders, list boxes, drop-down lists, spinners, various types of menus, toolbars, ribbons, combo boxes, tree views, grid views, navigation tabs, scrollbars, labels, tooltips, text in various fonts, balloons, dialog boxes, and various types of button controls including check boxes and radio buttons. An application interface may include one or more of the elements listed. Those skilled in the art will understand that this list is not exhaustive. The terms "visual representation", "visual component", and "visual interface element" are used interchangeably in this document. Other types of user interface elements include audio output components referred to as audio interface elements, tactile output components referred to as tactile interface elements, and the like.

A "user interface (UI) element handler" component, as the term is used in this document, includes a component configured to send information representing a program entity for presenting a user detectable representation of the program entity by an output device, such as a display. A "program entity" is an object included in and/or otherwise processed by an application or executable program component. The user detectable representation is presented based on the sent information. The sent information is referred to herein as "presentation information". Presentation information may include data in one or more formats. Exemplary formats include image formats such as JPEG, video formats such as MP4, markup language data such as HTML and other XML-based markup, and/or instructions such as those defined by various script languages, byte code, and/or machine code. For example, a web page received by a browser from a remote application provider may include HTML ECMAScript, and/or byte code for presenting one or more user interface elements included in a user interface of the remote application. Components configured to send information representing one or more program entities for presenting particular types of output by particular types of output devices include visual interface element handler components, audio interface element handler components, tactile interface element handler components, and the like.

A representation of a program entity may be represented and/or otherwise maintained in a presentation space. As used in this document, the term "presentation space" refers to a storage region allocated and/or otherwise provided for storing presentation information, which may include audio, visual, tactile, and/or other sensory data for presentation by and/or on an output device. For example, a buffer for storing an image and/or text string may be a presentation space. A presentation space may be physically and/or logically contiguous or non-contiguous. A presentation space may have a virtual as well as a physical representation. A presentation space may include a storage location in processor memory, secondary storage, a memory of an output device adapter device, and/or a storage medium of an output device. A screen of a display, for example, is a presentation space.

As used herein, the term "program" or "executable" refers to any data representation that may be translated into a set of machine code instructions and optionally associated program data. Thus, a program or executable may include an application, a shared or non-shared library, and a system command. Program representations other than machine code include object code, byte code, and source code. Object code includes a set of instructions and/or data elements that either are prepared for linking prior to loading or are loaded into an execution environment. When in an execution environment, object code may include references resolved by a linker and/or may include one or more unresolved references. The context in which this term is used will make clear that state of the object code when it is relevant. This definition can include machine code and virtual machine code, such as Java™ byte code.

As used herein, an "addressable entity" is a portion of a program specifiable in a source code language, which is addressable within a compatible execution environment. Examples of addressable entities include variables, constants, functions, subroutines, methods, classes, anonymous scoped instruction sets, and labeled instructions. Strictly speaking, the addressable entity contains a value or an instruction, but it is not the value or the instruction. In some places, this document will use "addressable entity" in a manner that refers to the content or value of an addressable entity. In these cases, the context will clearly indicate the intended meaning.

Addressable entities may have a number of corresponding representations. These representations include source code, object code, and any intermediate formats used by an interpreter, compiler, linker, loader, or analogous tool. Thus, terms such as "addressable source code entity" may be used in cases where the format is relevant and may be unclear from the context.

Returning to FIG. 7, first browser window 704a and second browser window 704b collectively and generically are referred to as browser window(s) 704. Browser windows 704 illustrate a number of visual user interface elements commonly found in applications. Browser windows 704 include respective menu bars 706 with menu controls for receiving user input to identify commands to perform. Browser windows 704 also include respective user interface elements providing respective presentation spaces 708 for presenting content including other visual components.

Various user interface elements of browser 404, web application agent 406, and/or web application 504 described above may be presented by one or more user interface element handler components 416 and/or response generator components 520. User interface element handler component(s) 416 in FIG. 4 may send presentation information representing a visual interface element(s), such as menu bar 706 illustrated in FIG. 7, to GUI subsystem 420. GUI subsystem 420 may instruct graphics subsystem 422 to draw the visual interface element(s) in a region of display presentation space 702 in FIG. 7, based on the presentation information.

Input may be received via input driver 424 in FIG. 4. For example, a user may move a mouse to move a pointer presented in display presentation space 702 over an operation identifier in menu bar 706. The user may provide an input detected by the mouse. The detected input may be received by GUI subsystem 420 via input driver 424 as an operation or command indicator based on the association of the shared location of the pointer and the operation identifier in display presentation space 702.

Figure 8:
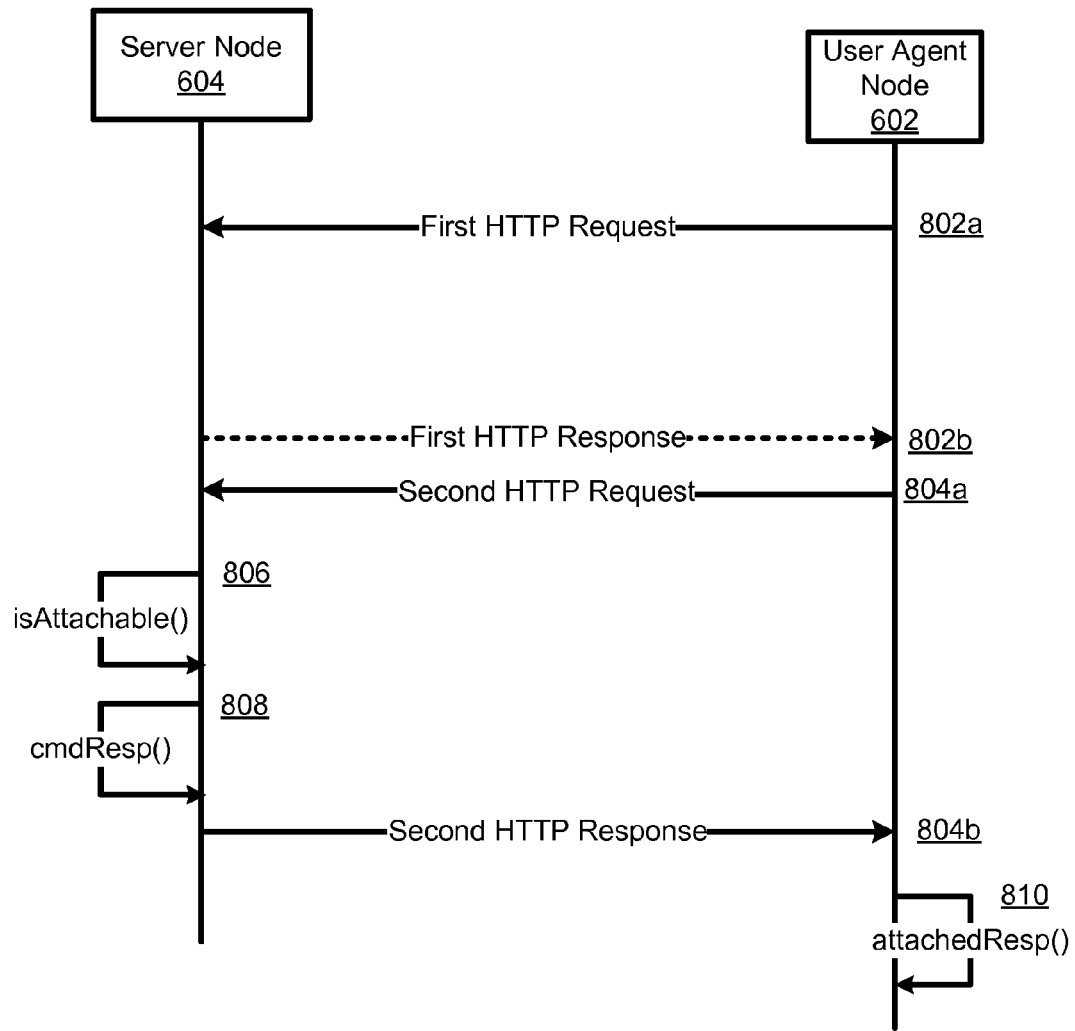
FIG. 8 is a message flow diagram illustrating a message flow in a system for processing an attached command response according to an aspect of the subject matter described herein.

FIG. 8 illustrates user agent node 602 in the role of a client and user agent sending, in first HTTP request message 802a, first command information to server node 604. The first command information identifies a first command for processing by server node 604.

With reference to FIG. 2a, block 250 illustrates that the method includes sending, in a first HTTP request to a server node, first command information identifying a first command. Accordingly, a system for processing an attached command response includes means for sending, in a first HTTP request to a server node, first command information identifying a first command. For example, as illustrated in FIG. 3a, request-out component 350 is configured for sending, in a first HTTP request to a server node, first command information identifying a first command. FIG. 4 illustrates request-out component 450 as an adaptation of and/or analog of request-out component 350 in FIG. 3a. One or more request-out components 450 operate in execution environment 402.

A command response for a command identified by command information received in a first HTTP request is referred to herein as an "attachable command response" when at least a portion of the attachable command response is includable in a second HTTP response to a second HTTP request. At most, a portion of the attachable command response may be sent in a first HTTP response to the first HTTP request. The first HTTP response may or may not be sent in various aspects. The attachable command response or a portion thereof is sent in second HTTP response to a second HTTP request including command information identifying a second command. The attachable command response or portion thereof included in the second HTTP response is herein said to be an "attached command response" and/or said to be included in an "attached command response". The command corresponding to an attachable command response is herein referred to an "attachable command". The second HTTP response is referred to herein as an "attachable HTTP response" before it includes the attached command. The second HTTP response is referred to herein as an "attached HTTP response" when it includes the attached command and/or has been transmitted via a network while including the attached command.

Note that an attached HTTP response differs in some aspects from a combined response message as defined and described in application Ser. No. 12/788,381, filed on 2010 May 27, entitled "Methods, Systems, and Program Products for Processing a Combined Command Response". A combined response includes multiple command responses to commands identified in multiple request messages. No response messages are sent that correspond only to the various multiple request messages as is allowed for commands having attached command responses. Further, a combined response message includes complete command responses whereas an attached command response may include some or all of a command response.

Adaptations and/or analogs of request-out component 350 in FIG. 3a, such as request-out 450 in FIG. 4, may send an HTTP request in various contexts. For example, browser 404 may send an HTTP request in response to a user input; in response to execution of an instruction in a script, a plug-in, and/or other extension of browser 404; and/or in response to processing a reference included in a web page and/or other resource.

FIG. 4 illustrates that a user input may be received by presentation controller component 418 and/or a UI element handler component 416 corresponding to a link in a web page such as a link associated with button UI element 712 illustrated in FIG. 7, an item in a bookmarks menu as illustrated in menu bars 706, and/or a history list (not shown). A URI may be received by presentation controller component 418 and/or a UI element handler component 416 via a keypad (physical or virtual) providing input for location bar 714. A web page may include a reference to a media representation for presenting in media presentation space 716b in a web page presented in presentation space 708b. A content handler component 414 processing the web page may detect a URI included in the reference. A resource such as the media representation may be retrieved by a script content handler component 414 interpreting a script included in web application agent 406, a media player plug-in, and/or other browser 404 extension in and/or otherwise interoperating with web application agent 406.

FIG. 9a, FIG. 9b, and FIG. 9c illustrate various HTTP messages in an HTTP communication between browser 404 operating in user agent node 602 and web application 504 operating in server node 604. FIG. 9a illustrates first HTTP request 900a including first command information identifying a first command. The first command information in HTTP request 900a includes URI 902a illustrated as www-.mySite.us/services/medata?mediaID=mediaA identifying a metadata service for retrieving metadata for an identified media item. The media item is identified, in FIG. 9a, in URI 902a by query parameter "mediaId" having a value of "mediaA". First command information in HTTP request 900a may also include an HTTP method token 904a illustrated as "GET". Additional data included in the first command information may be included in an HTTP header. For example, cookie header 906a identifies a session identifier illustrated by a "sessionid" cookie. A server node may identify a command or an aspect of a command based on a value of a cookie and/or other HTTP header information. Server node 604 may be identified by a host portion of URI 902a, "www.mySite.us". Command information identifying the first command in first HTTP request 900a may include information in one or more of URI 902a, HTTP method token 904a, and cookie header 906a.

FIG. 10a, FIG. 10b, and FIG. 10c illustrate various HTTP messages in an HTTP communication between browser 404 and web application 504. FIG. 10a illustrates first HTTP request 1000a. First HTTP request 1000a includes URI 1002a illustrated as www.mySite.us/path/formHandler.cgi identifying a service for processing a form. First HTTP request 1000a also includes HTTP method token 1004a illustrated as "POST". First command information may include form input 1006a. Form input 1006a is illustrated as an HTTP representation encoded according to MIME type "application/x-www-form-urlencoded". Server node 604 may be identified by a host portion of URI 1002a, www.mySite.us. Command information identifying the first command in first HTTP request 1000a may include information in one or more of URI 1002a, HTTP method token 1004a, and an HTTP entity that may be and/or may include an HTTP representation 1006a In the examples in the previous paragraphs, the various user inputs, instructions, and references identify a URI. A URI may identify a command for performing by a server or may be included in command information in an HTTP request that identifies a command. Command information may include information in one or more headers and/or HTTP entities. For example, a session identifier or information associated with a cookie may be combined with some or all of a URI to identify a command. Message body data may be included in command information identifying a command in some HTTP requests.

Command information as well as additional data, if any, may be provided to content manager component 412 to generate an HTTP request including the command information to identify a command for processing by a server. Command information may further include and/or may otherwise be based on an HTTP method token, such as GET, POST, PUT, DELETE, and HEAD. An HTTP method token may be provided by browser 404 and/or web application agent 406. Content manager component 412 in FIG. 4, operating in user agent node 602, may interoperate with HTTP layer 410 to send the first command information in first HTTP request message 802a to server node 604 via network 606. Server node 604 may be identified and located in network 606 by a URI in first HTTP request 802a.

An indication to send first HTTP request message 802a may be received by content manager component 412 from any of various user interface element handler components 416 and/or other components operating in and/or interoperating with browser 404, such as web application agent 406. Content manager component 412 may format data identifying the first command for inclusion in first HTTP request message 802a. Content manager component 412 may provide the formatted data to request-out component 450 to send first HTTP request message 802a via HTTP layer 410. HTTP layer 410 may send first HTTP request message 802a to server node 604 via network stack 408 and network 606.

A user agent node may send attach-request information to a server node to indicate that a command is attachable and/or otherwise allow the server node to determine that a command is attachable based on the attach-request information. The user agent node sends the attach-request information to receive an attached command response. A server node may determine a command is attachable based on attach-request information from a user agent node and/or may determine a command is attachable based on receiving attach-request information from one or more other sources.

With reference to FIG. 2b, block 260 illustrates that the method includes receiving, in a first HTTP request from a user agent node, first command information identifying a first command. Accordingly, a system for processing an attached command response includes means for receiving, in a first HTTP request from a user agent node, first command information identifying a first command. For example, as illustrated in FIG. 3b, the request-in component 360 is configured for receiving, in a first HTTP request from a user agent node, first command information identifying a first command. FIG. 5 illustrates request-in component 560 as an adaptation of and/or analog of request-in component 360 in FIG. 3b. One or more request-in components 560 operate in execution environment 502.

Request-in component 560 in FIG. 5, may receive command information in an HTTP request, such as first HTTP request 900a in FIG. 9a or first HTTP request 1000a in FIG. 10a, sent in first HTTP request message 802a from user agent node 602 via network stack 508, HTTP layer 510, and network application platform 506 as described above. Request-in component 560 may receive some or all information in an HTTP request by interoperating with network application platform 506. Request-in component 560 may identify a command based on command information in an HTTP request. Request-in component 560 may interoperate with one or more components in controller 512 to identify a command handler component 516 to perform an operation included in processing the command.

A first command handler component 516 may be invoked in response to the first command information included in first HTTP request message 802a. Controller 512 and/or request-in component 560 may identify the first command handler component 516 based on some or all of the URI. Command information identifying the first command may be processed by controller 512 in identifying the first command handler component 516.

A web browser, a web server, a web application, a web application platform, and a proxy server may operate as user agents and/or servers. As described above and illustrated in FIG. 9 and FIG. 10, at least a portion of a command, such as the first command and/or the second command, identified in an HTTP request may be identified by command information including and/or included in an HTTP method token, a URI, an HTTP request line, an HTTP general header, an HTTP request header, and/or an HTTP entity that may be and/or may include an HTTP representation.

FIG. 8 illustrates isAttachable message 806 communicated in server node 604 to an adaptation and/or analog of attach detector component 362 for determining that a first command response to the first command is attachable. The first command is identified in the first command information received in first HTTP request message 802a. In FIG. 8, isattachable message 806 is illustrated after second HTTP request message 804a. In various aspects, determining that the first command is attachable may be performed before, during, and/or after receiving second HTTP request message 804a.

Returning to FIG. 2a, block 262 illustrates that the method further includes determining that a first command response to the first command is attachable. Accordingly, a system for processing an attached command response includes means for determining that a first command response to the first command is attachable. For example, as illustrated in FIG. 3b, the attach detector component 362 is configured for determining that a first command response to the first command is attachable. FIG. 5 illustrates attach detector component 562 as an adaptation of and/or analog of attach detector component 362 in FIG. 3b. One or more attach detector components 562 operate in execution environment 502.

Attach detector component 562 in FIG. 5 may be invoked to determine whether a command identified in an HTTP request is attachable before invoking a command handler component 516, during processing of an operation included in performing the command by a command handler component 516, and/or after processing of the command by a command handler component 516. Attach detector component 562 may be invoked in response to receiving and/or otherwise detecting attach-request information indicating a command identified in an HTTP request is attachable. Attach-request information may be received and/or otherwise detected in a variety of ways described below.

An HTTP request may be sent by a user agent node and received by a server node without any explicit indication in the HTTP request that the command identified in the HTTP request may have an attachable command response. In FIG. 4, browser 404 may instruct request-out component 450 to send first HTTP request message 802a without determining whether the command identified in the HTTP request has or may have an attachable command response. For the command identified in first HTTP request message 802a, determining whether the command response is attachable may be left to server node 604.

In the method illustrated in FIG. 2b determining that a command response for a command identified in an HTTP request is attachable may include receiving attach-request information based on the HTTP request identifying the command, another received HTTP request, a user input detected by an input device, an access to a location in a data storage medium storing attach-request information, an availability of a resource for performing the command, and a determination that a temporal condition associated with performing the command is met. In the method illustrated in FIG. 2a, sending command information may include sending attach-request information to the server node by the user agent and/or on behalf of the user agent by another component in an execution environment hosting the user agent. Some or all attach-request information sent by and/or on behalf of a user agent may be included in an HTTP request in an HTTP request line, an HTTP general header, an HTTP request header, an HTTP entity header, and/or an HTTP entity that includes an HTTP representation. Thus, a server node may determine that a command response for a command is attachable based on attach-request information detected in an HTTP request line, an HTTP general header, an HTTP request header, an HTTP entity header, and/or an HTTP entity that includes an HTTP representation.

In FIG. 4, content manager component 412 may instruct request-out component 450 to send attach-request information in an HTTP request to web application 504. The HTTP request may be received by web application 504 and the attach-request information may be received by attach detector component 562 via request-in component 560, controller 512, a command handler component 516, a response generator component 520, and/or other component(s) included in processing the HTTP request. Some or all of the attach-request information may be included in and/or otherwise identified by an attach header defined to include and/or otherwise identify some or all of the attach-request information and included in the HTTP request.

Attach-request information may be associated with a particular HTTP communication identified, for example, by a session identifier. Attach-request information may be HTTP request specific, command specific, application specific, user specific, device specific, and/or group specific, to name a few examples. Attach-request information may be sent by user agent node 602 to server node 604 via a protocol other than HTTP. For example, a systems management protocol may be used to exchange configuration options including attach-request information between user agent node 602 and server node 604.

Some or all attach-request information for the first command identified in first HTTP request message 802a may be included and/or otherwise identified in first HTTP request message 802a. Alternatively or additionally, some of all of the attach-request information may be included in another message received prior to sending any of the first command response to user agent node 602. For example, some or all of the attach-request information may be sent in second HTTP request 804a.

In an aspect, attach-request information may include a MIME-type identifier defined to indicate that a command response for a command is attachable. A server node may determine that a command identified in an HTTP request has an attachable command response based on the MIME-type identifier. First HTTP request 900a in FIG. 9a includes a multipart/attached MIME type identifier. "Multipart/attached" may be defined to indicate that a command response to the command identified in first HTTP request 900a sent in first request message 802a is attachable. In FIG. 4, a text/html content handler component 414 may instruct content manager component 412 to send first HTTP request 900a in FIG. 9a in first HTTP request message 802a in FIG. 8 including multipart/attached MIME type identifier 908a in an HTTP ACCEPT header as illustrated to indicate that the first command response for the command identified in first HTTP request 900a is attachable. In FIG. 5, attach detector component 562 interoperating with controller 512 may detect MIME type identifier 908a and determine that the first command response for the first command identified in first HTTP request 900a is attachable.

Attach-request information may identify an attach-request condition for evaluating by a server node and/or may be included in evaluating an attach-request condition. In an aspect, an attach-request condition may identify a temporal condition for evaluating by a server node. For example, attach-request information processed by attach detector component 562 in FIG. 5 may identify a duration of time for processing and responding to a command received in an HTTP request. The condition may be met when the command cannot be processed and/or responded to within the duration specified based on the temporal condition. The command response for the command may be determined to be attachable by the server node in response to determining that the temporal condition in the attach-request condition is met. A command handler component 516 may determine that a command received in an HTTP request cannot be processed and/or has not been processed in the specified duration. In response, the command handler component 516 may interoperate with attach detector component 562 to determine that the command response for the command is attachable.

An attach-request condition may be based on a count. In FIG. 4, content manager component 414 may identify a count, such as "2", identified in a web page markup language and/or in metadata for a presented media item. The count may be included in attach-request information sent in an HTTP request by request-out component 450 to web application 504 in FIG. 5. Attach detector component 562 may identify attachable command responses based on the count. For example, attach detector component 562 may determine that every other command received has an attachable command response. In still another aspect, attach-request information identifying a count may be accessed as configuration data for web application 504 and received during web application 504 configuration rather than and/or in addition to receiving attach-request information in a message via a network.

An attach-request condition may be based on a specified time, a duration of time, a state of a server, a MIME type of an HTTP representation included in an HTTP response, a user agent attribute identified in a general header of an HTTP request, and the like.

A command response for a command may be determined to be attachable based on determining that a resource for performing the command is unavailable. A web page presented to a user by presentation controller component 418 in FIG. 4 may indicate that a document is being edited by another user. A UI element handler component 416 may detect a user input for sending an HTTP request including a command for accessing the document and including attach-request information. The attach-request information indicates that the command response to the user's command is attachable to attach detector component 562 in FIG. 5.

In another aspect, attach-request information may be sent based on configuration information for web application agent 406 in FIG. 4. A script included in web application agent 406 may be configured to include attach-request information in an HTTP request sent by and/or in response to executing the script. Alternatively or additionally, a user of browser 404 may configure browser 404 to include attach-request information in some or all HTTP requests according to the user's preferences and browser 404 capabilities. In still another aspect, attach-request information may be received by browser 404 in a message sent by a systems management application operating in a remote node. In yet another aspect, web application agent 406 may receive an HTTP response indicating that a resource accessed via web application 504 in FIG. 5 is currently unavailable. Web application agent 406 and/or browser 404 may send an HTTP request including attach-request information in response to the indication rather than waiting to retry later and/or polling web application 504 until the resource is available. Web application agent 406 may send the HTTP request including the attach-request information automatically in response to receiving the indication from web application 504.

Attach-request information may instruct and/or otherwise cause a server to queue and/or cache a command identifier received in an HTTP request. A server may queue and/or cache a command until an attach-request condition, described below, is met. Attach detector component 562 may manage a command queue and/or list. Attach detector component 562 may be configured to process a command in a list or queue when resource(s) required for performing the command are available.

As described above, a command handler component 516 may be invoked for performing an operation for a command identifier received in an HTTP request by request-in component 560 in FIG. 5. A first command handler component 516 may be invoked by controller 512 for performing some or all of the processing for the first command identified by the first command information received in first HTTP request message 802a. Processing of a command, such as the first command, may generate and/or otherwise identify a result or command response. For the first command identified by the first command information received in first HTTP request message 802a, a first command response and/or data for the first command response may be generated by first command handler component 516. A command response or a portion of a command response may include and/or provide access to any valid HTTP entity and/or HTTP representation such as hypertext markup language (HTML) and/or other markup language, a scripting language, byte code, image data, audio data, and/or machine code.

In an aspect, the method illustrated in FIG. 2b may also include sending an HTTP response for an HTTP request identifying an attachable command. The HTTP response either does not include the command response or includes only a portion of the command response. The HTTP response may be sent by the server node in response to determining that the command response for the command is attachable. The method illustrated in FIG. 2a may also include receiving an HTTP response for an HTTP request identifying a command with an attachable command response. The HTTP response includes at most a portion of the command response to the command.

FIG. 8 illustrates an optional first HTTP response message 802b sent by server node 604 and received by user agent node 602. In FIG. 5, attach detector component 562 operating in server node 604 may communicate with response generator component 520 to instruct response-out component 530 to send first HTTP response message 802b as a response to first HTTP request message 802a.

FIG. 10b illustrates an exemplary first HTTP response 1000b to first HTTP request 1000a. Note that HTTP response 1000b does not include a command response to the first command identified in first HTTP request 1000a. An HTTP response may be sent from a server to a user agent node without starting and/or completing processing of a command identified in a corresponding HTTP request allowing a user agent to receive information before and/or during processing of the command.

First HTTP response message 802*b*, in a further aspect, may include attach-response information indicating to the user agent that at least portion of the first command response is not included in the first HTTP response. First HTTP response 1000*b* in FIG. 10*b* illustrates status code 1004*b* including a status code defined to indicate that first HTTP response 1000*b* does not include any and/or some of the first command response. Alternatively or additionally, the "Yes" value of attach content header 1006*b* may indicate that some or all of the first command response is not included.

A server node may include and a user agent node may detect attach-response information in an HTTP response in an HTTP response line, an HTTP general header, an HTTP response header, an HTTP entity header, and/or an HTTP entity that may include an HTTP representation. Some or all of the attach-response information may be included in an attach header defined to include and/or otherwise identify at least a portion of the attach-response information. Attach-response information may include a MIME-type identifier defined to indicate that a command response has and/or will be attached.

FIG. 10*b* illustrates status code 1004*b* included in first HTTP response 1000*b*. FIG. 10*b* also illustrates attach header 1006*b* that additionally or alternatively may be included in attach-response information in first HTTP response 1000*b*. First HTTP response 1000*b* further illustrates attach cookie 1008*b* which may be additionally or alternatively included in attach-response information. A user agent node may determine that the some or all of the first command response is not included in first HTTP response 1000*b* based on one or more of status code 1004*b*, attach header 1006*b*, and attach cookie 1008*b*.

In an aspect, a server node might send no HTTP response to an HTTP request identifying an attachable command to a user agent requesting the command. The server node may send no HTTP response based on an indication or instructing in no-attach-request.

Returning to FIG. 2*a*, block 252 illustrates that the method yet further includes sending, in a second HTTP request, second command information identifying a second command. Accordingly, a system for processing an attached command response includes means for sending, in a second HTTP request, second command information identifying a second command. For example, as illustrated in FIG. 3*a*, request-out component 350 is configured for sending, in a second HTTP request, second command information identifying a second command.

FIG. 8 illustrates user agent node 602 sending a second command identified in second HTTP request message 804*a*. FIG. 8 illustrates second HTTP request message 804*a* sent after first HTTP request message 802*a*. In various aspects, second command information may be sent by browser 404 to web application 504 in second HTTP request message 804*a* before, during, or after first command information in the first HTTP request message 802*a* is sent. Similarly, FIG. 8 illustrates second HTTP request message 804*a* sent after optional first HTTP response message 802*b*. In various aspects, the second command information may be sent by browser 404 to web application 504 in second HTTP request message 804*a* before, during, or after first HTTP response message 802*b* is sent.

Various adaptations of request-out component 350 in FIG. 3*a*, such as request-out component 450 in FIG. 4, may send second HTTP request message 804*a* including second command information identifying the second command in response to a user input, execution of a script instruction, processing of a reference in a web page, and the like as described above with respect to the first HTTP request. The second HTTP request in second HTTP request message 804*a* may include a second URI identifying a different resource than identified by the URI in the HTTP request in first HTTP request message 802*a*.

Returning to FIG. 2*b*, block 264 illustrates that the method yet further includes receiving, in a second HTTP request from the user agent node, second command information identifying a second command. Accordingly, a system for processing an attached command response includes means for receiving, in a second HTTP request from the user agent node, second command information identifying a second command. For example, as illustrated in FIG. 3*b*, attach director component 364 is configured for receiving, in a second HTTP request from the user agent node, second command information identifying a second command.

As described above, controller 512 in FIG. 5 may invoke a command handler component 516 to perform some or all of a command identified by command information received in an HTTP request by request-in component 560. The second command in second HTTP request 804*a* may be processed, at least in part, by a second command handler component 516 as described above.

As mentioned above, determining that a command response is attachable may be performed before, during, and/or after receiving another HTTP request identifying another attachable command. FIG. 8 illustrates isAttachable message 806 communicated in server node 604 to an adaptation and/or analog of attach detector component 362 after second HTTP request message 804*a* is received. Determining that the first command response to the first command identified in the first HTTP request received in message 802*a* is attachable may include determining whether a second HTTP response is attachable. The second HTTP response may be an HTTP response to the second HTTP request received in message 804*a* is attachable.

FIG. 9*b* illustrates exemplary second HTTP request 900*b* and FIG. 9*c* illustrates second HTTP response 900*c* as an attachable HTTP response to second HTTP request 900*b*. Second HTTP request 900*b* includes second URI 902*b* illustrated as www.mySite.us/media/mediaA identifying a media file and/or record including video and/or audio data for presenting by browser 404. Second URI 902*b* is included in second command information identifying a second command. A second HTTP method token 904*b*, illustrated as "GET", may be included in the second command information according to an aspect of web application 504. In various aspects, the second command information may include other information in second HTTP request 900*b* for identifying an operation to perform in processing the identified second command. The command may be sent by request-out component 450 operating in user agent node 602 to server node 604 identified by www.mySite.us in second URI 902*b*.

The communication illustrated by FIG. 10*a*, FIG. 10*b*, and FIG. 10*c* includes a second HTTP request corresponding to second HTTP response 1000*c*, but the second HTTP request is not shown in order to allow key elements in the communication illustrated by FIG. 10*a*, FIG. 10*b*, and FIG. 10*c* to fit on a single page.

Attach detector component 562 may instruct response generator component 520 to send the first command response, via response-out component 530, in an attachable HTTP response to a second HTTP request received from browser 404. An HTTP response to the first HTTP request message 802a is not sent, in an aspect. FIG. 9a, FIG. 9b, and FIG. 9c show no HTTP response for first HTTP request 900a. There may be no one-to-one relationship between HTTP requests and HTTP responses contrary to RFC 2616. A server node may send an attached HTTP response including some or all of an attachable command response for a command and send no HTTP response to the HTTP request that identified the command.

In yet another aspect, a user agent node may send another HTTP request, referred to as a non-attachable HTTP request, for receiving and processing by the server while a first attachable command identified in a first HTTP request is being processed. The non-attachable HTTP request may include another command for processing by the server. The non-attachable HTTP request may include and/or otherwise be associated with non-attach-request information indicating that an attached HTTP response may not be sent as an HTTP response to the non-attachable HTTP request. An HTTP response may be sent for the non-attachable HTTP request including a command response for the command identified by the non-attachable HTTP request, but the HTTP response does not include any portion of a command response for an attachable command identified in yet another HTTP request. Such an HTTP response is referred to herein as an unattached HTTP response.

In FIG. 8, the second command identified by second command information in second HTTP request message 804a may or may not be processed prior to sending attached second HTTP response message 804b. In an aspect, the second command identified in second HTTP request message 804a may be processed and some or all of the second command response may be attached and returned in an attached HTTP response other than second HTTP response message 804b. The first command response may be generated before during and/or after the second command response is generated.

In an aspect, attach-request information may indicate whether an HTTP response is attachable. A server node may determine and/or otherwise identify that an HTTP response is attachable based on attach-request information. Attach-request information may identify an attach-request condition and/or provide information for determining whether an attach-request condition is met by a server node for determining that an HTTP response for an HTTP request is attachable.

A user agent node may send attach-request information in an HTTP request identifying its HTTP response as attachable, in an HTTP request identifying a command having an attachable command response, in some other HTTP request, and/or in a message sent via a protocol other than HTTP. A user agent node may send attach-request information in response to a user input detected by an input device, based on accessing at least a portion of the attach-request information from a location in a data storage medium, based on receiving a message including at least a portion of the attach-request information, determining that a resource for performing the first command is unavailable, and/or in response to determining that a temporal condition associated with performing the command is met A server node may receive attach-request information based on an HTTP request identifying a command with an attachable command response, an HTTP request having an attachable HTTP response, some other HTTP request, a message sent via a protocol other than HTTP, a user input detected by an input device, an access to a location in a data storage medium, an availability of a resource for performing the first command, and/or a determination that a temporal condition associated with performing the first command is not met.

In an aspect, an attach-request condition may identify a temporal condition for evaluating by a server node. For example, attach-request information may be accessed by attach detector component 562 in FIG. 5. The accessed information may identify a duration of time for measuring after identifying and/or processing the first command identified by first HTTP request message 802a. Attach detector component 562 may determine that a temporal condition is met based on the specified duration when second HTTP request message 804a is received before the duration is measured. In response to determining the temporal condition is met, attach detector component 562 may determine second HTTP request received in second HTTP message 804a has an attachable second HTTP response. In another aspect, the duration may be associated with performing the second command. If the second command is processed within the identified duration, attach detector component 562 may determine second HTTP response to send in second HTTP response message 804b is attachable.

An attach-request condition may be based on a count. In FIG. 4, content manager component 414 may identify a count, such as "2", identified in a web page markup language and/or in metadata for a presented media item. The count may be included in attach-request information sent in an HTTP request by request-out component 450 to web application 504. The HTTP request may be sent prior to first HTTP request message 802a. Attach detector component 562 in FIG. 5 may count HTTP requests received from browser 404 subsequent to receiving the count in the attach-request information. Attach detector component 562, in an aspect, may identify every other HTTP response to be sent to browser 404 as attachable. Second HTTP request message 804a may include an HTTP response that matches this condition and thus may be determined to be attachable. In an aspect, the count may be for counting HTTP requests to identify their corresponding HTTP responses as attachable.

An attachable HTTP response and/or an attached HTTP response may be identified based on a value of a header, an HTTP entity, an HTTP representation, a URI, and/or an HTTP method token. An attach-request condition may be based a specified time, a duration of time, a state of a server, a MIME type of an HTTP representation included in an HTTP response, a user agent attribute identified in a general header of an HTTP request, and the like. For example, multipart/attached MIME type identifier 908b in FIG. 9b may be defined as includable in attach-request information in second HTTP response 900b to identify second HTTP response 900c in FIG. 9c as attachable.

A command handler component 516 may process a command identified in an HTTP request. In an aspect, the command may be determined to have an attachable command response, based on processing time required for performing the command. In response to performing the command, command handler component 516 may notify attach detector component 562 to determine and/or otherwise identify an attachable HTTP response for sending some or all of the attachable command response to a user agent that identified the corresponding command. In an aspect, attach detector component 562 may identify as attachable the next HTTP response to another HTTP request that is scheduled to be sent most immediately to the user agent. In another aspect, attach detector component 562 may interoperate with a command handler component 516 for a command and with a response generator component 520 to send whatever portion of an attachable command response to the command is available whenever HTTP responses for HTTP requests identifying other commands are sent to the user agent that requested the attachable command. In yet another aspect, identifying attachable HTTP responses may be based on a timer that expires at repeated fixed and/or variable durations of time.

In a further aspect, a server may defer performing some or all of a command with an attachable response and/or may defer generating some or all of an attachable command response until an attach-request condition is met.

Returning to FIG. 2b, block 266 illustrates that the method additionally includes sending, in a second HTTP response to the second HTTP request, an attached command response including at least a portion of a first command response to the first command, in response to determining that the first command response is attachable. Accordingly, a system for processing an attached command response includes means for sending, in a second HTTP response to the second HTTP request, an attached command response including at least a portion of a first command response to the first command, in response to determining that the first command response is attachable. For example, as illustrated in FIG. 3b, attach director component 364 is configured for sending, in a second HTTP response to the second HTTP request, an attached command response including at least a portion of a first command response to the first command, in response to determining that the first command response is attachable.

FIG. 8 illustrates cmdResp message 808 communicated in server node 604 to an adaptation and/or analog of attach director component 364 to include some or all of the attachable first command response in second HTTP response message 804b. FIG. 8 also illustrates server node 604 sending the attached command response in second HTTP response message 804b for receiving by user agent node 602 operating as a user agent.

In FIG. 5, some or all of the first command response to the first command identified by first HTTP request message 802a may be generated by a response generator component 520 interoperating with a command handler component 516. Some or all of the first command response may be provided to response-out component 530 as indicated by attach director component 564. Attach director component 564 may interoperate with attached detector component 562 to receive information identifying attachable command responses and/or attachable HTTP responses for directing the generation and sending of attached HTTP responses. In an aspect, the second command response to the second command identified in second HTTP request message 804a may also be provided to response-out component 530. Response-out component 530 in FIG. 5 may interoperate with HTTP layer 510 to send a command response in an HTTP response. Some or all of the HTTP response may be generated by response-out component 530. In an aspect, a response-out component 530 may provide command-response information to network application platform 506 and/or HTTP layer 510 to include in a command response in an HTTP response generated by controller 512, network application platform 506, and/or HTTP layer 510.

Response-out component 530 may generate and/or otherwise transform at least some of first command-response information into one or more HTTP entities and/or HTTP representations to include as an attached command response in the attachable second HTTP response to send in second HTTP response message 804b. At least some of the second command response may be included in the second HTTP response or not. Response-out component 530 sends second HTTP response message 804b as a response to second HTTP request message 804a. In response to determining that the first command response is attachable, response-out component 530 includes some or all of the first command response as an attached command response in second HTTP response message 804b. Some or all of an attached command response may include and/or be included in an HTTP status code, an HTTP entity, and/or an HTTP representation in an attached HTTP response.

Returning to FIG. 2a, block 254 illustrates that the method additionally includes receiving a second HTTP response to the second HTTP request. Accordingly, a system for processing an attached command response includes means for receiving a second HTTP response to the second HTTP request. For example, as illustrated in FIG. 3a, response-in component 352 is configured for receiving a second HTTP response to the second HTTP request.

FIG. 4 illustrates response-in component 452 as an adaptation of and/or analog of response-in component 352 in FIG. 3a. Operation of response-in component 452 in receiving an HTTP response is described above.

Returning to FIG. 2a, block 256 illustrates that the method additionally includes determining, in response to sending the first command information, that the second HTTP response includes an attached command response including at least a portion of a first command response to the first command. Accordingly, a system for processing an attached command response includes means for determining, in response to sending the first command information, that the second HTTP response includes an attached command response including at least a portion of a first command response to the first command. For example, as illustrated in FIG. 3a, attached response component 354 is configured for determining, in response to sending the first command information, that the second HTTP response includes an attached command response including at least a portion of a first command response to the first command. FIG. 4 illustrates attached response component 454 as an adaptation of and/or analog of attached response component 354 in FIG. 3a. FIG. 8 illustrates attachedResp message 810 communicated in user agent node 602 to an adaptation and/or analog of an attached response component 354 for determining whether second HTTP response 804b is an attached HTTP response.

A user agent node may determine that an HTTP response is attached based on receiving attach-response information for determining whether an attach-request condition is met. Attach-response information may be sent and/or received in first HTTP response message 802b, second HTTP response message 804b, another HTTP response, and/or a message sent via a protocol other than HTTP. Attach-response information may be included in a user agent node's configuration and/or in a server node's configuration.

An attach-response condition may be based on an identified time, a duration of time, a state of a user agent, a MIME type of an HTTP representation included in an HTTP response, a server attribute identified in a header of an HTTP response, and the like.

In an aspect, attach-response information may include and/or otherwise identify an attached matching criterion for determining whether an attach-response condition is met. For example, an attached matching criterion may include an attached HTTP response correlator identifying a location in an HTTP response for identifying the attached command response and/or may include a symbolic identifier for matching to identify the attached command response. First HTTP response 1000b in FIG. 10b illustrates a correlator in attach header 1006b. Attach director component 564 may instruct response-out component 530 to include attach header 1006b and/or attach cookie 1008b in first HTTP response 1000b in FIG. 10b. Second HTTP response 1000c in FIG. 10c may be sent in first HTTP response message 802b in FIG. 8. Either or both attach header 1006*b* and attach cookie 1008*b* may allow browser 404 and/or web application agent 406 to identify the attached command response in second HTTP response message 804*b* in FIG. 8*b*. Second HTTP response message 804*b* may include second HTTP response 1000*c* in FIG. 10*c* also including the identified correlator. FIG. 10*c* illustrates attached command response 1004*c* in HTTP entity 1006*c* in second HTPP response 1000*c*. Attached command response 1004*c* is the first command response for the first command identified in first HTTP request 1000*a* in FIG. 10*a*, which may be sent in message 802*a* in FIG. 8. The correlator in the various aspects described and/or illustrated may be included in attach-request information for determining whether an attach-request condition which is met by detecting matching correlators. The second command response is illustrated by second HTTP representation 1008*c* included in second HTTP entity 1010*c*. FIG. 10*c* illustrates status code 1012*c* as a status code for the second HTTP request (not shown) in the communication illustrated in FIG. 10*a*, FIG. 10*b*, and FIG. 10*c*.

In FIG. 5, response-out components 530 operating in server node 604 may communicate with one or more response-generator components 520 to receive some or all first command response information and second command response information.

In yet another aspect, attach-response information may identify an instruction for processing an attached command response by a user agent and/or may identify other data for configuring the user agent to process the attached command response. For example, web application 504 may include a script and/or applet in first HTTP response message 802*b* for processing some or all of the first command response when it is received by browser 404 in an attached HTTP response in an attached command response.

Attach-response information may be provided for determining whether an attach-response condition is met. A user agent node may be configured to determine that an HTTP response sent from the server node and received by the user agent node is an attached second HTTP response including some or all of a first command response to the first command, based on determining that the attach-response condition is met.

FIG. 9*c* illustrates exemplary attached second HTTP response 900*c* sent by server node 604 and received by user agent node 602. In FIG. 5 attach director component 564 operating in server node 604 may communicate with one or more response generator components 520 to direct some or all first command-response information and second command-response information to response-out component 530 for generating and/or providing for generating attached second HTTP response 900*c*. Command responses may be included in an attached HTTP response in the order in which they were sent and/or received. The first command response is illustrated by first HTTP representation 904*c* in first HTTP entity 906*c*. The second command response is illustrated by second HTTP representation 908*c* included in second HTTP entity 910*c*.

Status code 912*c* is included as a second status code for second HTTP request 900*b* as specified in RFC 2616. In another aspect, a separate first attached status code may be provided in an attached HTTP response, for example as an entity header in first HTTP entity 906*c*. Response-out component 530 may instruct controller 512 to send attached second HTTP response message 804*b* as it sends other HTTP responses described above.

In FIG. 4, response-in component 452 may receive information included in second HTTP response message 804*b* from HTTP layer 410. Response-in component 452 may provide some or all of second HTTP response message 804*b* and/or information based on second HTTP response message 804*b* to attached response component 454. Attached response component 454 may determine that second HTTP response message 804*b* is an attached HTTP response and locate the attached command response including the first command response or a portion of the first command response in second HTTP response message 804*b*.

Attached response component 454 may be included in web application agent 406 and may present a representation of the first command-response information and/or otherwise process the information in an application specific manner. This allows browser 404 to operate in a stateless manner with respect to HTTP communication as specified in RFC 2616. Alternatively or additionally, some or all of attached response component 454 may be included in browser 404. Browser 404 may operate in a stateless manner and/or may track state information for attached commands. In an aspect, browser 404 may maintain an association between an attached command and a tab, window, and/or other UI element handler component 416 to direct presentation of information based on attached command responses to user interface elements presented by the associated UI element handler component(s) 416.

In another aspect, browser 404 may process attached command responses without maintaining any state information. A user agent may identify and/or create a presentation space in a user interface element and present a user detectable representation generated based on an attached command response in the first presentation space of the UI element. A second command response received with the attached command response in an attached HTTP request may be presented in a same or different presentation space of a same or different UI element. In one aspect presenting the user detectable representation based on the attached command response for the first command may include identifying a second command response, generated by the server by performing the second command, in an attached second HTTP response including the attached command response; and generating the user detectable representation from the attached command response and the second command response.

For example, browser 404 may present information based on an attached command response in a new user interface element without regard to a presented web page from which the attached command originated and without regard to the one or more UI element handler components 416 presenting the web page.

Attached response component 454 in FIG. 4 may determine that an HTTP response is attached and may locate or otherwise identify attached command-response information based on any of the various attached indicators and/or analogs in various adaptations and aspects.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more instruction-processing units, or by a combination of both. The description herein of any sequence of actions is not intended to imply that the specific order described for performing that sequence must be followed.

Moreover, the methods described herein may be embodied in executable instructions stored in a non-transitory computer readable storage medium for use by or in connection with an instruction execution machine, system, apparatus, or device, such as a computer-based or processor-containing machine, system, apparatus, or device. As used here, a "non-transitory computer readable storage medium" may include one or more of any suitable media for storing the executable instructions of a computer program in one or more of an electronic, magnetic, optical, and electromagnetic form, such that the instruction execution machine, system, apparatus, or device may read (or fetch) the instructions from the non-transitory computer readable storage medium and execute the instructions for carrying out the described methods. A non-exhaustive list of conventional exemplary non-transitory computer readable storage media includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), a Blu-ray™ disc; and the like.

Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating any non-claimed element is essential to the practice of the subject matter as claimed.

I claim:

1. A method for processing an attached command response, the method comprising:
    sending, by a user agent node in a first HTTP request to a server node, a first HTTP request-line identifying a first command;
    sending, by the user agent node, in a second HTTP request, a second HTTP request-line identifying a second command different from the first command, wherein the second HTTP request is sent separately from the first HTTP request;
    receiving, by the user agent node, a second HTTP response to the second HTTP request, the second HTTP response including at least a portion of a second command response to the second command, wherein the user agent node does not receive a complete response to the first HTTP request prior to receiving the second HTTP response; and
    determining, by the user agent node, that the second HTTP response includes an attached command response including at least a portion of a first command response to the first command, wherein the attached command response is attached based on attach-request information received from the user agent node.

2. The method of claim 1 further includes receiving, as a response to the first HTTP request, a first HTTP response including at most a portion of the first command response.

3. The method of claim 1 wherein determining that the second HTTP response includes the attached command response includes receiving attach-response information for detecting the attached command response in the second HTTP response.

4. The method of claim 1 further includes receiving no HTTP response as a response for the first HTTP request.

5. The method of claim 1 further comprises:
    sending, to the server node, the attach-request information at least one of indicating that the first command response is attachable and indicating that the second HTTP response is attachable.

6. The method of claim 5 wherein the attach-request information identifies at least one of a MIME type and an HTTP method token for indicating that the first command is attachable.

7. A method for processing an attached command response, the method comprising:
    receiving, by a server node in a first HTTP request from a user agent node, a first HTTP request-line identifying a first command;
    receiving, by a server node in a second HTTP request from the user agent node, a second HTTP request-line identifying a second command different than the first command, wherein the second HTTP request is received separately from the first HTTP request;
    receiving, by the server node, attach-request information indicating that at least one of the first command response and a second HTTP response is attachable; and
    sending, to the user agent node by a server node in the second HTTP response to the second HTTP request, an attached command response including at least a portion of a first command response to the first command, based on the attach-request information, wherein the second HTTP response includes at least a portion of a second command response to the second command.

8. The method of claim 7 where in determining the first command is attached includes determining the first command is attachable based on determining that the second HTTP response is attachable.

9. The method of claim 7 further includes sending, in a first HTTP response to the first HTTP request, less than the entire first command response, in response to determining the first command response is attachable.

10. The method of claim 9 wherein the first HTTP response includes attach-response information for indicating that the less than the entire first command response is included in the first HTTP response.

11. The method of claim 7 further includes, in response to determining that the first command is attachable sending no HTTP response for the first HTTP request.

12. The method of claim 7 further comprises:
receiving, in a third HTTP request from the user agent node, an HTTP request-line identifying a third command;
determining that a third HTTP response to the third HTTP request is not attachable; and
sending the third HTTP response including, for the third command, a third command response at least partially generated while processing at least one of the first command and the second command, and not including, based on determining the third HTTP response is not attachable, the attached command response.

13. The method of claim 7 wherein receiving the attach-request information includes receiving attach request information from the user agent.

14. The method of claim 13 wherein the attach-request information identifies at least one of a MIME type and an HTTP method token specified for indicating the first command is attachable.

15. The method of claim 13 wherein sending the attached command response includes sending the attached command response in the second HTTP response, in response to determining that the second HTTP response is attachable.

16. The method of claim 15 further includes, in response to receiving the attach-request information, at least one of performing the first command and generating the attached command response.

17. The method of claim 7 wherein sending the attached command response includes sending attach-response information indicating that the second HTTP response includes the attached command response.

18. A system for processing an attached command response, the system comprising:
an execution environment including a hardware processor, wherein an instruction included in at least one of a request-out component, a response-in component, and an attached response component is executed by the hardware processor;
the request-out component configured for sending, by a user agent node in a first HTTP request to a server node, a first HTTP request-line identifying a first command;
the request-out component configured for sending, by the user agent node, in a second HTTP request, a second HTTP request-line identifying a second command different from the first command, wherein the second HTTP request is sent separately from the first HTTP request;
the response-in component configured for receiving, by the user agent node, a second HTTP response to the second HTTP request, the second HTTP response including at least a portion of a second command response to the second command, wherein the user agent node does not receive a complete response to the first HTTP request prior to receiving the second HTTP response; and
the attached response component configured for determining, by the user agent node, that the second HTTP response includes an attached command response including at least a portion of a first command response to the first command, wherein the attached command response is attached based on attach-request information received from the user agent node.

19. A system for processing an attached command response, the system comprising:
an execution environment including a processor, wherein an instruction included in at least one of a request-in component, an attach detector component, and an attach director component is executed by the processor;
the request-in component configured for receiving, by a server node in a first HTTP request from a user agent node, a first HTTP request-line identifying a first command;
the request-in component configured for receiving, by a server node in a second HTTP request from the user agent node, a second HTTP request-line identifying a second command different than the first command, wherein the second HTTP request is received separately from the first HTTP request;
the attach detector component configured for receiving, by the server node and from the user agent node, attach-request information indicating that at least one of the first command response and a second HTTP response is attachable; and
the attach director component configured for sending, to the user agent node by a server node in the second HTTP response to the second HTTP request, an attached command response including at least a portion of a first command response to the first command, based on the attach-request information, wherein the second HTTP response includes at least a portion of a second command response to the second command.

20. A non-transitory computer readable storage medium embodying a computer program, executable by a machine, for processing an attached command response, the computer program comprising executable instructions for:
sending, by a user agent node in a first HTTP request to a server node, a first HTTP request-line identifying a first command;
sending, by the user agent node, in a second HTTP request, a second HTTP request-line identifying a second command different from the first command, wherein the second HTTP request is sent separately from the first HTTP request;
receiving, by the user agent node, a second HTTP response to the second HTTP request, the second HTTP response including at least a portion of a second command response to the second command, wherein the user agent node does not receive a complete response to the first HTTP request prior to receiving the second HTTP response; and
determining, by the user agent node, that the second HTTP response includes an attached command response including at least a portion of a first command response to the first command, wherein the attached command response is attached based on attach-request information received from the user agent node.

21. A non-transitory computer readable storage medium embodying a computer program, executable by a machine, for processing an attached command response, the computer program comprising executable instructions for:
receiving, by a server node in a first HTTP request from a user agent node, a first HTTP request-line identifying a first command;
receiving, by a server node in a second HTTP request from the user agent node, a second HTTP request-line identifying a second command different than the first command, wherein the second HTTP request is received separately from the first HTTP request;
receiving, by the server node, attach-request information indicating that at least one of the first command response and a second HTTP response is attachable; and sending, to the user agent node by a server node in the second HTTP response to the second HTTP request, an attached command response including at least a portion of a first command response to the first command, based on the attach-request information, wherein the second HTTP response includes at least a portion of a second command response to the second command.

* * * * *